United States Patent
Chondro et al.

(10) Patent No.: US 11,528,435 B2
(45) Date of Patent: Dec. 13, 2022

(54) IMAGE DEHAZING METHOD AND IMAGE DEHAZING APPARATUS USING THE SAME

(71) Applicant: Industrial Technology Research Institute, Hsinchu (TW)

(72) Inventors: Peter Chondro, Surabaya (ID); De-Qin Gao, Yunlin County (TW)

(73) Assignee: Industrial Technology Research Institute, Hsinchu (TW)

(*) Notice: Subject to any disclaimer, the term of this patent is extended or adjusted under 35 U.S.C. 154(b) by 53 days.

(21) Appl. No.: 17/134,216

(22) Filed: Dec. 25, 2020

(65) Prior Publication Data

US 2022/0210350 A1  Jun. 30, 2022

(51) Int. Cl.
*H04N 5/357* (2011.01)
*G06T 5/00* (2006.01)

(52) U.S. Cl.
CPC ............ *H04N 5/357* (2013.01); *G06T 5/002* (2013.01); *G06T 5/003* (2013.01); *G06T 2207/10024* (2013.01)

(58) Field of Classification Search
None
See application file for complete search history.

(56) References Cited

U.S. PATENT DOCUMENTS

| | | |
|---|---|---|
| 8,103,120 B2 | 1/2012 | Choi et al. |
| 8,290,294 B2 | 10/2012 | Kopf et al. |
| 8,457,418 B2 | 6/2013 | Jerdev |
| 8,576,310 B2 | 11/2013 | Tatsuzawa |
| 9,025,029 B2 | 5/2015 | Choi |
| 9,996,913 B2 | 6/2018 | Beck et al. |
| 9,998,692 B1* | 6/2018 | Griffiths ............... H04N 17/002 |
| 10,140,690 B2 | 11/2018 | Chakraborty et al. |
| 2008/0285853 A1 | 11/2008 | Bressan |
| 2015/0009355 A1* | 1/2015 | Peng ..................... H04N 5/235 348/222.1 |
| 2019/0260978 A1* | 8/2019 | Guérin .................... G06T 5/008 |

(Continued)

FOREIGN PATENT DOCUMENTS

| | | |
|---|---|---|
| CN | 103942758 | 7/2014 |
| CN | 107464227 | 12/2017 |
| CN | 108734670 | 11/2018 |

(Continued)

OTHER PUBLICATIONS

Integrating Semantic Segmentation and Retinex Model for Low Light Image Enhancement, Minhao Fan et al, Oct. 16, 2020 (Year: 2020).*

(Continued)

*Primary Examiner* — James M Hannett
(74) *Attorney, Agent, or Firm* — JCIPRNET

(57) ABSTRACT

The disclosure is directed to an image dehazing method and an image dehazing apparatus using the same method. In an aspect, the disclosure is directed to an image dehazing method, and the method would include not limited to: receiving an input image; dehazing the image by a dehazing module to output a dehazed RGB image; recovering image brightness of the dehazed RGB image by a high dynamic range (HDR) module to output an HDR image; and removing reflection of the HDR image by a ReflectNet inference model, wherein the ReflectNet inference model uses a deep learning architecture.

22 Claims, 23 Drawing Sheets

(56) References Cited

U.S. PATENT DOCUMENTS

2020/0322580 A1* 10/2020 Pu .................... G06T 3/4015

FOREIGN PATENT DOCUMENTS

| CN | 109978798 | | 7/2019 |
|---|---|---|---|
| EP | 3051823 | A1 * | 8/2016 |
| JP | 2019165832 | | 10/2019 |
| TW | 201120814 | | 6/2011 |
| TW | I401473 | | 7/2013 |
| TW | 201535323 | | 9/2015 |
| TW | 201937451 | | 9/2019 |
| TW | 201944357 | | 11/2019 |
| WO | 2015190184 | | 12/2015 |
| WO | 2017175231 | | 10/2017 |
| WO | WO-2021239858 | A1 * | 12/2021 |

OTHER PUBLICATIONS

Separating Reflection and Transmission Images in the Wild, Patrick Wiescholleketal, Sep. 10, 2018 (Year: 2018).*

Encyclopaedia Britannica, "Camera", Jun. 11, 2020, available at: https://www.britannica.com/ technology/camera, pp. 1-5.

Shinpei Kato, et al., "An Open Approach to Autonomous Vehicles," IEEE Micro, vol. 35, No. 6, Dec. 29, 2015, pp. 60-68.

Alejandro González, et al., "Pedestrian Detection at Day/Night Time with Visible and FIR Cameras: A Comparison," Sensors, vol. 16, No. 6. Jun. 4, 2016, pp. 1-11.

Imran Ashraf, et al., "An Investigation of Interpolation Techniques to Generate 2D Intensity Image From LIDAR Data," IEEE Access, vol. 5, No. 1, May 2, 2017, pp. 8250-8260.

Philip Sallis, et al., "Air Pollution and Fog Detection through Vehicular Sensors," IEEE, 2014 8th Asia Modelling Symposium,Taipei, Sep. 2014, pp. 181-186.

Clemens Dannheim, et al., "Air pollution and fog detection through vehicular sensors," Library of Auckland University of Technology, Jan. 1, 2015, pp. 1-6.

H. E. Hawkins, et al., "Radar Performance Degradation in Fog and Rain," IRE Transactions on Aeronautical and Navigational Electronics, vol. ANE-6, No. 1, Mar. 1959, 26-30.

Robin Heinzler, et al., "Weather Influence and Classification with Automotive Lidar Sensors," IEEE Intelligent Vehicles Symposium (IV), Jun. 2019, pp. 1-8.

Martin Roser, et al., "Classification of Weather Situations on Single Color Images," IEEE Intelligent Vehicles Symposium, Jun. 2008, pp. 798-803.

Jose Carlos Villarreal Guerra, et al., "Weather Classification: A new multi-class dataset, data augmentation approach and comprehensive evaluations of Convolutional Neural Networks," NASA/ESA Conference on Adaptive Hardware and Systems (AHS), Aug. 2018, pp. 305-310.

Hiroyuki Kurihata, et al., "Rainy Weather Recognition from In-vehicle Camera Images for Driver Assistance," IEEE Intelligent Vehicle Symposium, Jun. 2005, pp. 205-210.

Joseph Redmon, et al., "YOLOv3: An Incremental Improvement," arXiv: 1804.02767, Apr. 2018, pp. 1-6.

Anat Levin, et al., "A Closed-Form Solution to Natural Image Matting," IEEE Transactions on Pattern Analysis and Machine Intelligence, vol. 30, No. 2, Feb. 2008, pp. 228-242.

Dat Ngo, et al., "Improved Color Attenuation Prior for Single-Image Haze Removal," Applied Science, Sep. 2019, pp. 1-22.

Open CV, "Histogram Equalization," Open Source Computer Vision, retrieved on Nov. 23, 2020, available at: https://docs.opencv.org/3.4/d4/d1b/tutorial_histogram_equalization.html, pp. 1-4.

Qingnan Fan, et al., "A Generic Deep Architecture for Single Image Reflection Removal and Image Smoothing," IEEE International Conference on Computer Vision (ICCV), Oct. 2017, pp. 1-30.

G. Raju, et al., "A fast and efficient color image enhancement method based on fuzzy-logic and histogram," International Journal of Electronics and Communications (AEÜ), Mar. 2014, pp. 237-243.

Sos S. Agaian, et al., "Transform coefficient histogram-based image enhancement algorithms using contrast entropy," IEEE Transactions on Image Processing, vol. 16, No. 3, Mar. 2007, pp. 741-758.

"Office Action of Japan Counterpart Application", dated Mar. 29, 2022, p. 1-p. 2.

"Office Action of Japan Counterpart Application", dated Jul. 5, 2022, p. 1-p. 2.

"Office Action of Taiwan Counterpart Application", dated Aug. 30, 2022, p. 1-p. 13.

* cited by examiner

|  | Proposed Method | Benchmarked Method |
|---|---|---|
| Framework | TensorFlow 2.0 + OpenCV | |
| Hardware | CPU 3.0GHz Intel i5-8500 - RAM 16GB - GPU NVidia GTX1070 8GB - HDD 4.5TB | |
| Software | Ubuntu 16.04 LTS - CUDA 10.0 - CuDNN 7.4.2 - Python 3 | |
| Resolution | $W_M = 608$ \| $H_M = 384$ | |
| Dehazing | Guided Least Estimation Dehazing | Color Attenuation Prior [14] |
| Enhance | HDR Enhancement | Histogram Equalization [15] |
| Reflection* | ReflectNet | CEILNet [16] |

FIG. 22

|  | Benchmarked Method | | | Proposed Method | | |
|---|---|---|---|---|---|---|
|  | Dehazing | HDR | Reflect* | Dehazing | HDR | Reflect* |
| EME | 1.605 | 1.727 | 1.699 | 1.998 | 1.914 | 2.336 |
| CII | 1.488 | 2.067 | 2.294 | 2.068 | 2.395 | 2.695 |
| IM | 55.2% | | | 74.8% | | |
| Time Cost (ms) | 12.295 | 4.384 | 29.870 | 8.153 | 3.451 | 27.321 |

FIG. 23

| | Object Detection using YOLOv3 [12] | | |
|---|---|---|---|
| | Original RGB | Benchmark RGB | Proposed RGB |
| ACC | 0.497 | 0.516 | 0.579 |
| FPR | 0.144 | 0.186 | 0.035 | highlighted numbers represent better scores 2501, 2502

FIG. 25

IMAGE DEHAZING METHOD AND IMAGE DEHAZING APPARATUS USING THE SAME

TECHNICAL FIELD

The disclosure is directed to an image dehazing method and an image dehazing apparatus using the same method.

BACKGROUND

Since the advent of imaging device using a slit technique that passes light to expose a silver chloride-coated paper which could be darkened spatially according to traveling light intensities, the utilization of imaging devices has increased yearly as more and more end-users have become patrons that may indirectly support advancement of imaging device from static to dynamic image capturing (i.e. video camera). From professional, scientific to consumer electronics, the applicability of imaging devices has never been broader than ever before. Supported with mass production system, the cost of imaging devices per pixel density has lowered accordingly. These conditions have incubated the strong presence of imaging devices (i.e. camera) for broader applications in related fields of engineering.

With the increased capabilities of Internet-of-Things (IoT) in consumer electronics, the development of autonomous driving vehicle (ADV) has become more relevant. FIG. 1 illustrates an ADV that utilizes different imaging sensors to sense the surrounding environments for obstacles. One of the most prominent imaging devices in ADVs is the Red Green Blue color (RGB) camera, which is able to provide dense semantic or instance information of surrounding environment within a limited field of view (FOV) of the corresponding camera. This particular information would provide essential data for actuators to achieve ADV's main target, that is, to move autonomously from one location to another location, while avoiding object or obstacles within surrounding trajectories' predictions. Various processing could be applied to image data such as object detection, image segmentation, object tracking, depth estimation and other related applications.

Aside from the capabilities of the subsequent processing modules, perceived quality from the corresponding RGB camera could affect the performance of said subsequent processing modules.

Table 1 compares the properties of RGB cameras on different environment constraints. According to Table 1, RGB cameras are susceptible to interferences from light-based or weather-based conditions. Since RGB cameras are passive sensors, the image data is highly dependent to the perceived traveling light signal into sensor array. Any airborne particulate or intermediary substance that would attenuate/disperse the traveling light signal is considered as decimating factors for RGB cameras.

TABLE 1

| Constraints | Properties | Constraints | Properties |
|---|---|---|---|
| Sensor Type | Passive | Weather Effect | Mildly Sensitive |
| Lux Interference | Highly Sensitive | Field of View | Limited |
| Exposure Effect | Highly Sensitive | Resolution | Dense |

In the development of ADVs, different weather conditions are uncontrollable variable that would affect the image quality of RGB cameras on certain degrees. Adverse weathers on common scenarios for ADV development can be classified into: (a) sun-glare/direct-light exposure, (b) rainy/snowy condition and (c) foggy/hazy condition. For scenarios involving sun-glare/direct-light exposure, the image quality from an RGB camera would degrade as direct exposure clips/saturates the light sensor array, which may affect not only the exposed image region but also its neighboring image regions. This particular scenario reduces the perceived objectness by lowering the image entropy because of the overly exposed pixels and its neighboring region(s). Consequently, image features from prominent objects were suppressed. This creates arduous task for most object detection algorithms to generate proper detection.

For scenarios involving rainy/snowy condition, the presence of intermediary substances such as water droplets or snowflakes attenuates the total amount of light entering the camera lens with attenuation degree directly corresponds to the intensity of either rain/snow condition. These substances may also create image distortions and/or FOV obstructions depending on how the RGB camera is installed and/or designed. Similarly, scenarios that involves foggy/hazy condition would also decimate the visibility of RGB camera since the presence of humid air/pollutants absorbs a certain degree of light intensity depending on how severe is the corresponding haze/fog situation. Consequently, similar to rainy/snowy condition, either foggy/hazy condition would also provide a challenge for most object detection algorithm to perform analysis such as feature extraction since most high-frequency information are suppressed.

As practical instances, during clear afternoon condition shown in FIG. 2A, the perceived objectness is clear with considerable contrast and image visibility. However, adverse conditions shown in FIG. 2B such as imbalanced intensities in low light environment as well as heavy rain condition have created undesirable circumstances that questions the reliability of RGB cameras for surround object sensing on autonomous driving vehicles. During the imbalance intensities in low light environment, the contrast ratio was suppressed because of excessive exposures that affects other pixels' intensities to be shifted on higher range of histogram values. During the heavy rain condition, atmospheric channel has increased due to presence of airborne substances that attenuated the amount of traveling light to the sensor array. These conditions demonstrate the limitations of RGB cameras as passive sensing device.

In practical perspective, the utilization of software solution as an image preprocessing function to enhance the quality of RGB images could become an element of patch for RGB cameras, of which image quality is commonly decimated by adverse weather conditions. Yet, hardware improvement for RGB cameras is necessary as a complementing patch for any software solution to significantly address the reliability of RGB camera during any type of weather conditions (either adverse or normal). In image preprocessing function, the RGB image is processed either pixel-wisely or region-wisely with common aims to enhance the image contrast as well as to improve the perceived objectness through selective filtering (i.e. haze removal).

FIG. 2C compares the performance of an object detection algorithm in related arts (for example, YOLOv3 as taught by J. Redmon et al., "*YOLOv3: An Incremental Improvement*," arXiv: 1804.02767, April 2018) with input images from both original and processed RGB versions. The original RGB images were obtained directly from corresponding camera during adverse weather condition such as (left-top to right-bottom) overexposed, underexposed, rainy condition and foggy condition. On the other hand, the processed RGB images are the product of image preprocessing function on the corresponding original RGB images; thus, it can be called an enhanced version of the original RGB images. In this related art, image dehazing and high dynamic range (HDR) enhancement were used as the image preprocessing function.

Referring to FIG. 2C, in this related art, the detection rates of the implemented object detection algorithm using original RGB images are lower compared to the detection rates of the implemented object detection algorithm using processed RGB images. This condition has suggested that the image preprocessing was able to enhance the perceived objectness of the original RGB images; thus, enabling higher image visibility for the algorithm's classifier to detect any previously conceived objects. In addition, in terms of false positive rate, both original and processed RGB images are identically low. Although in a perspective, this condition could be contributed from the robustness of implemented object detection algorithm in this related art; this condition may demonstrate the capability of image preprocessing in avoiding over-enhancement that would create undesired artefact that would result in false positive(s).

According to the aforementioned, an image preprocessing technique to regulate and to improve the perceived quality of RGB images is important for subsequent computational photography. The application of processed RGB images could be stretched within the scope of computer and machine vision. The most common application is autonomous driving vehicle that includes ground, aerial or marine vehicles, which would require RGB cameras as sensing devices. However, since it has been demonstrated that those RGB cameras may have quality degradation over assorted adverse weather situations, an image preprocessing function is required as a solution patch that would improve both image contrast and perceived object under various weather conditions (either adverse or normal weather conditions) without resulting in any false or over enhancement effect.

SUMMARY OF THE DISCLOSURE

Accordingly, the disclosure is directed to an image dehazing method and an image dehazing apparatus using the same method.

In an aspect, the disclosure is directed to an image dehazing method, and the method would include not limited to: receiving an input image; dehazing the image by a dehazing module to output a dehazed RGB image; recovering image brightness of the dehazed RGB image by a high dynamic range (HDR) module to output an HDR image; and removing reflection of the HDR image by a ReflectNet inference model, wherein the ReflectNet inference model uses a deep learning architecture.

In an aspect, the disclosure is directed to an image dehazing apparatus which includes not limited to: a sensor and a processor coupled to the sensor. The processor is configured at least to: receiving an input image; dehazing the image by a dehazing module to output a dehazed RGB image; recovering image brightness of the dehazed RGB image by an HDR module to output an HDR image; and removing reflection of the HDR image by a ReflectNet inference model, wherein the ReflectNet inference model uses a deep learning architecture.

To make the aforementioned more comprehensible, several embodiments accompanied with drawings are described in detail as follows. It is to be understood that both the foregoing general description and the following detailed description are exemplary and are intended to provide further explanation of the disclosure as claimed.

It should be understood, however, that this summary may not contain all of the aspect and embodiments of the disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 22 is a table which compares an implementation example of an image dehazing method with a benchmark method in related art.

FIG. 23 is a table which compares performance evaluations of an implementation example of an image dehazing method with a benchmark method in related art.

FIG. 25 is a table which illustrates performance evaluations of object detection on RGB images processed by an image dehazing method in accordance with one of the exemplary embodiments of the disclosure in comparison with the performance evaluations of object detection on original RGB images and RGB images processed by a benchmark method in related art.

DETAILED DESCRIPTION OF DISCLOSED EMBODIMENTS

Figure 1:
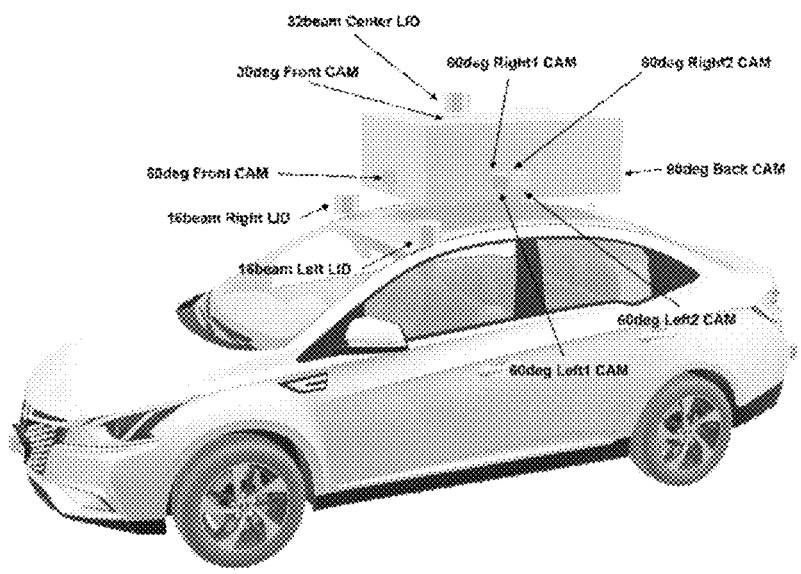
FIG. 1 illustrates an Autonomous Driving Vehicle (ADV) that utilizes different imaging sensors to sense the surrounding environments for obstacles.
Figure 2A:
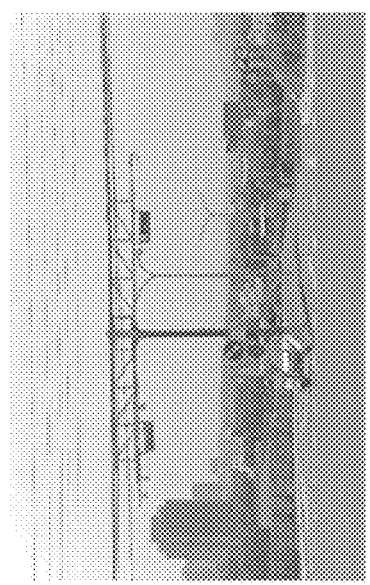
FIG. 2A illustrates images acquired by an RGB camera in clear afternoon condition.
Figure 2B:
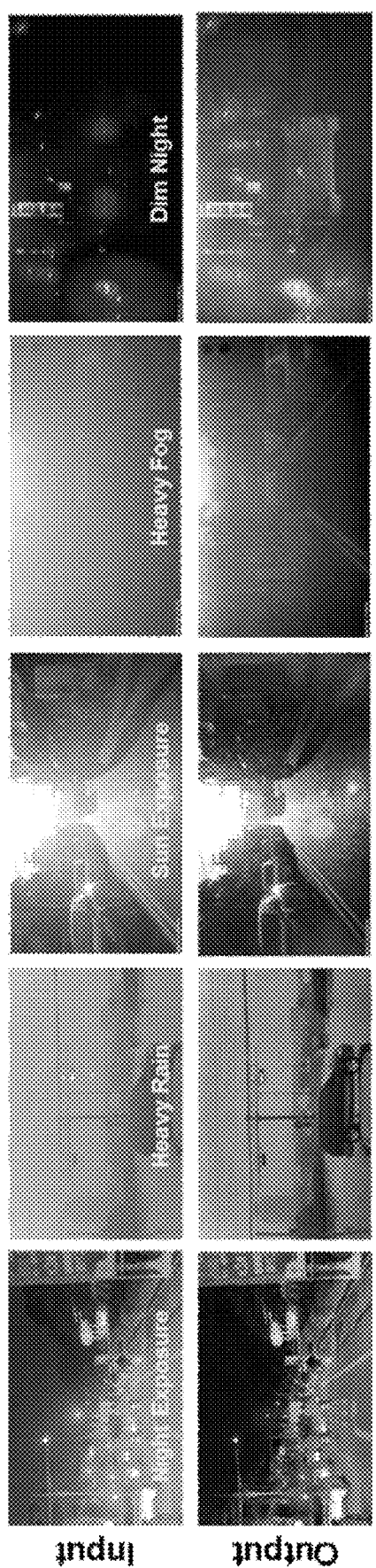
FIG. 2B illustrates that RGB cameras are susceptible for adverse conditions such as night exposure, heavy rain, sun exposure, heavy fog, and dim night.
Figure 2C:
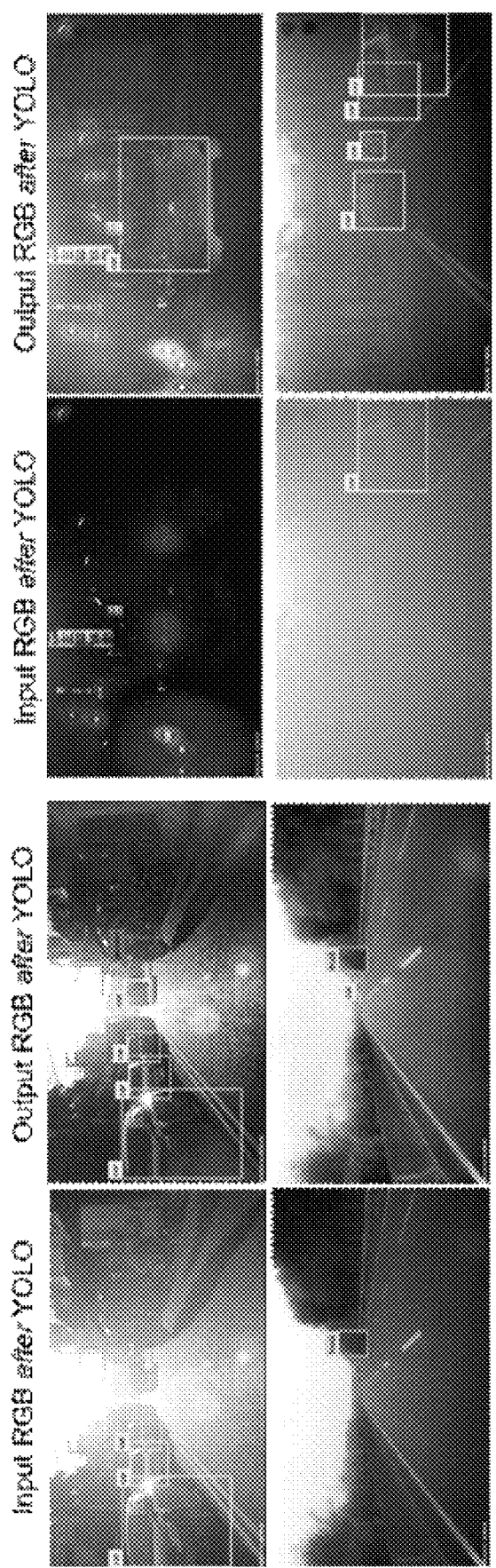
FIG. 2C illustrates effects of image preprocessing on RGB images for an object detection algorithm.

Reference will now be made in detail to the present exemplary embodiments of the disclosure, examples of which are illustrated in the accompanying drawings. Wherever possible, the same reference numbers are used in the drawings and the description to refer to the same or like parts.

For the above described challenges, the disclosure provides a hybrid image processing framework to solve various challenges that might be encountered in deployment of digital vision technology. The framework is to be explained from the perspective of an image dehazing apparatus that uses an image dehazing method. The apparatus could be disposed within, for example, automated or any robotic systems in outdoor environments, such as autonomous vehicles, aerial drones, and marine drones, etc. The apparatus would include not limited to a sensor and a processor coupled to the sensor, and the processor is configured at least to receive an input image, dehaze the image by a dehazing module to output a dehazed RGB image, recover image brightness of the dehazed RGB image by an HDR module to output an HDR image, and remove reflection of the HDR image by a ReflectNet inference model, wherein the ReflectNet inference model uses a deep learning architecture. Through the provided framework, image quality could be enhanced, and performance of subsequent processing such as object detection and image segmentation could be improved.

Figure 3:
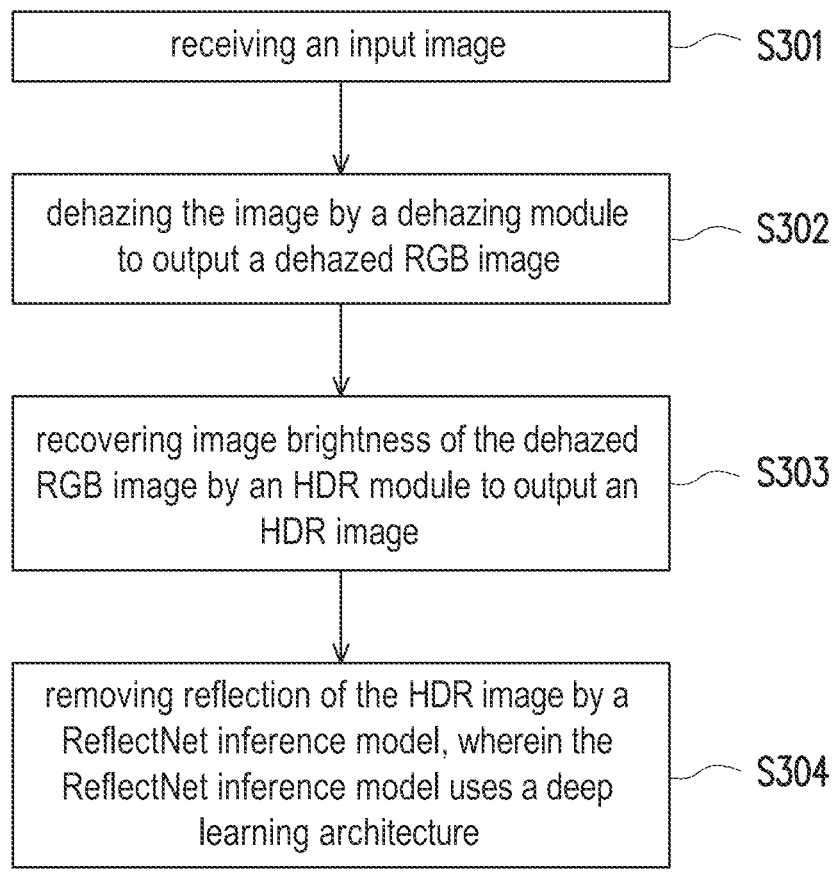
FIG. 3 is a flow chart which illustrates steps of an image dehazing method in accordance with one of the exemplary embodiments of the disclosure.

FIG. 3 is a flow chart which illustrates steps of an image dehazing method in accordance with one of the exemplary embodiments of the disclosure. In step S301, the image dehazing apparatus would receive, through the sensor, an input image. In step S302, the image dehazing apparatus would dehaze the image by a dehazing module to output a dehazed RGB image. In step S303, the image dehazing apparatus would recover image brightness of the dehazed RGB image by an HDR module to output an HDR image. In step S304, the image dehazing apparatus would remove reflection of the HDR image by a ReflectNet inference model, wherein the ReflectNet inference model uses a deep learning architecture.

Figure 4:
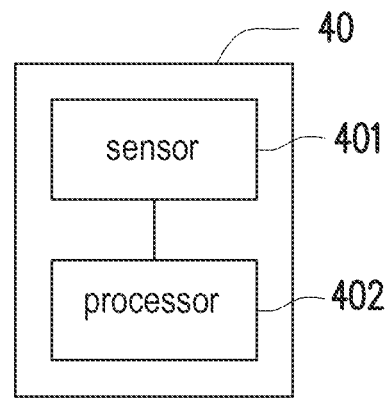
FIG. 4 illustrates a block diagram of an image dehazing apparatus in accordance with one of the exemplary embodiments of the disclosure.

FIG. 4 illustrates a block diagram of an image dehazing apparatus in accordance with one of the exemplary embodiments of the disclosure. The image dehazing apparatus 40 would include not limited to a sensor 401 and a processor 402 coupled to the sensor 401. The processor 402 would be configured at least to receive an input image, dehaze the image by a dehazing module to output a dehazed RGB image, recover image brightness of the dehazed RGB image by an HDR module to output an HDR image, and remove reflection of the HDR image by a ReflectNet inference model, wherein the ReflectNet inference model uses a deep learning architecture.

Figure 5:
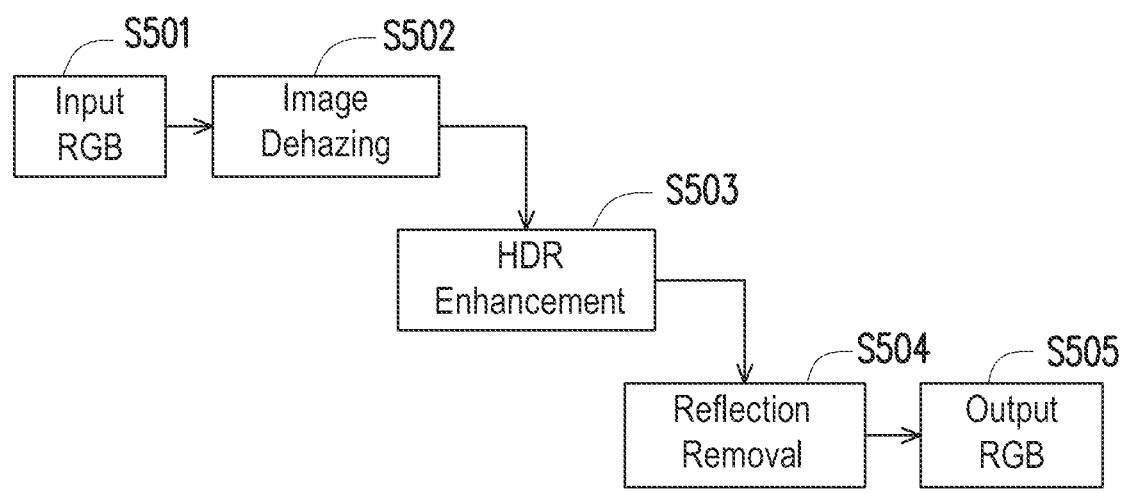
FIG. 5 is a flow chart which illustrates steps of an image dehazing method in accordance with one of the exemplary embodiments of the disclosure.

FIG. 5 is a flow chart which illustrates steps of an image dehazing method in accordance with one of the exemplary embodiments of the disclosure. In step S501, the image dehazing apparatus would receive an input RGB image through the sensor. In step S502, in one of the exemplary embodiments, the image dehazing apparatus would dehaze the RGB image and output a dehazed RGB image by an image dehazing module. To be more specific, the image dehazing apparatus could detect and recover the attenuation effects that are contributed from the presence of haze/rain or any other intermediary substances between camera sensor and objects. In one embodiment, the image dehazing module could be designed with a traditional computer vision to detect haze volume based on depth perception and then linearly compensate or recover the affected pixels, while preserving the sense of depth in the 2D RGB image. Concretely, the image dehazing apparatus could recover pixels from haze or rain that genuinely increase image brightness. In step S503, in one of the exemplary embodiments, the image dehazing apparatus would recover image brightness of the dehazed RGB image by an HDR module to output an HDR image. To be more specific, the HDR module could be designed to improve the dynamic range of the corresponding RGB image. In one embodiment, the image dehazing apparatus could compensate the image darkening that might be introduced by the image dehazing module or naturally from low-light environment. Concretely, the image dehazing apparatus could create a brightness enhancement that finds a balance between the low-light pixels against any bright-light pixels. In step S504, the image dehazing apparatus would remove reflection of the HDR image. In one of the exemplary embodiments, the reflection removal could employ a machine learning approach with native functionality for image segmentation, of which task is to separate the reflection map from the input image to obtain the reflection-free output image. Concretely, in one embodiment, reflection removal could be implemented by a ReflectNet inference model which may use a deep learning architecture such as an encoder-decoder network.

Figure 6:
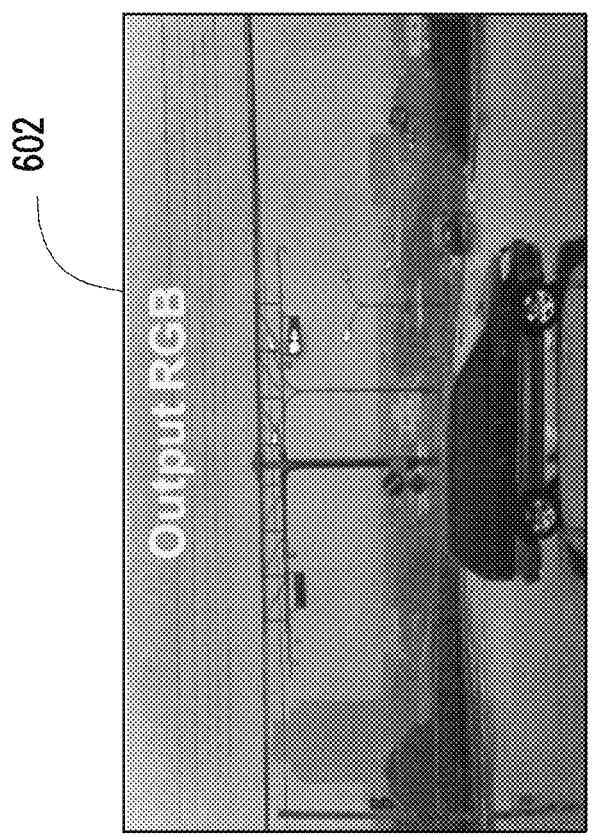
FIG. 6 illustrates an implementation example of an input RGB image and an output RGB image processed by an image dehazing method in accordance with one of the exemplary embodiments of the disclosure.
Figure 6:
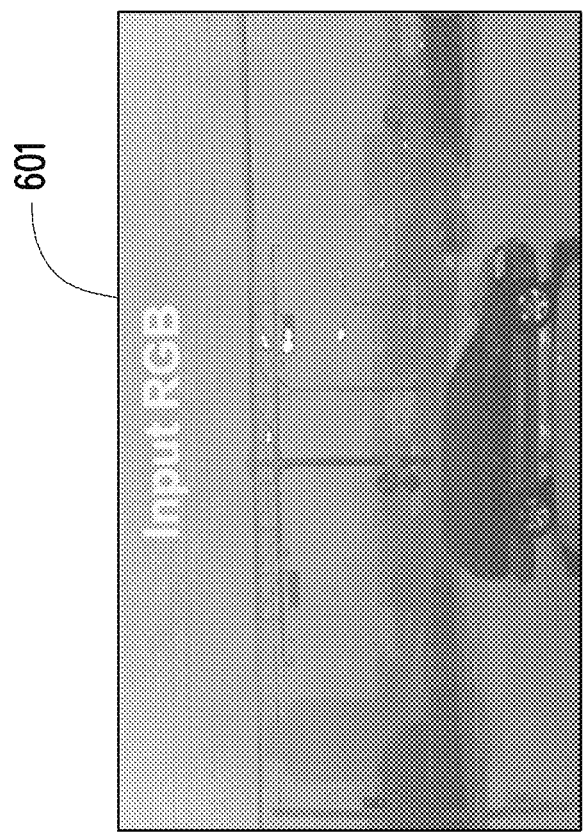

FIG. 6 illustrates an implementation example of an input RGB image and an output RGB image processed by an image dehazing method in accordance with one of the exemplary embodiments of the disclosure. Referring to FIG. 6, image 601 is an example of input RGB image that could be received by the sensor as shown in step S501 of FIG. 5, and image 602 is an example of output RGB image that could be generated in step S505 of FIG. 5 after the image 601 had gone through the processing of step S502~S504 as shown in FIG. 5.

Figure 7:
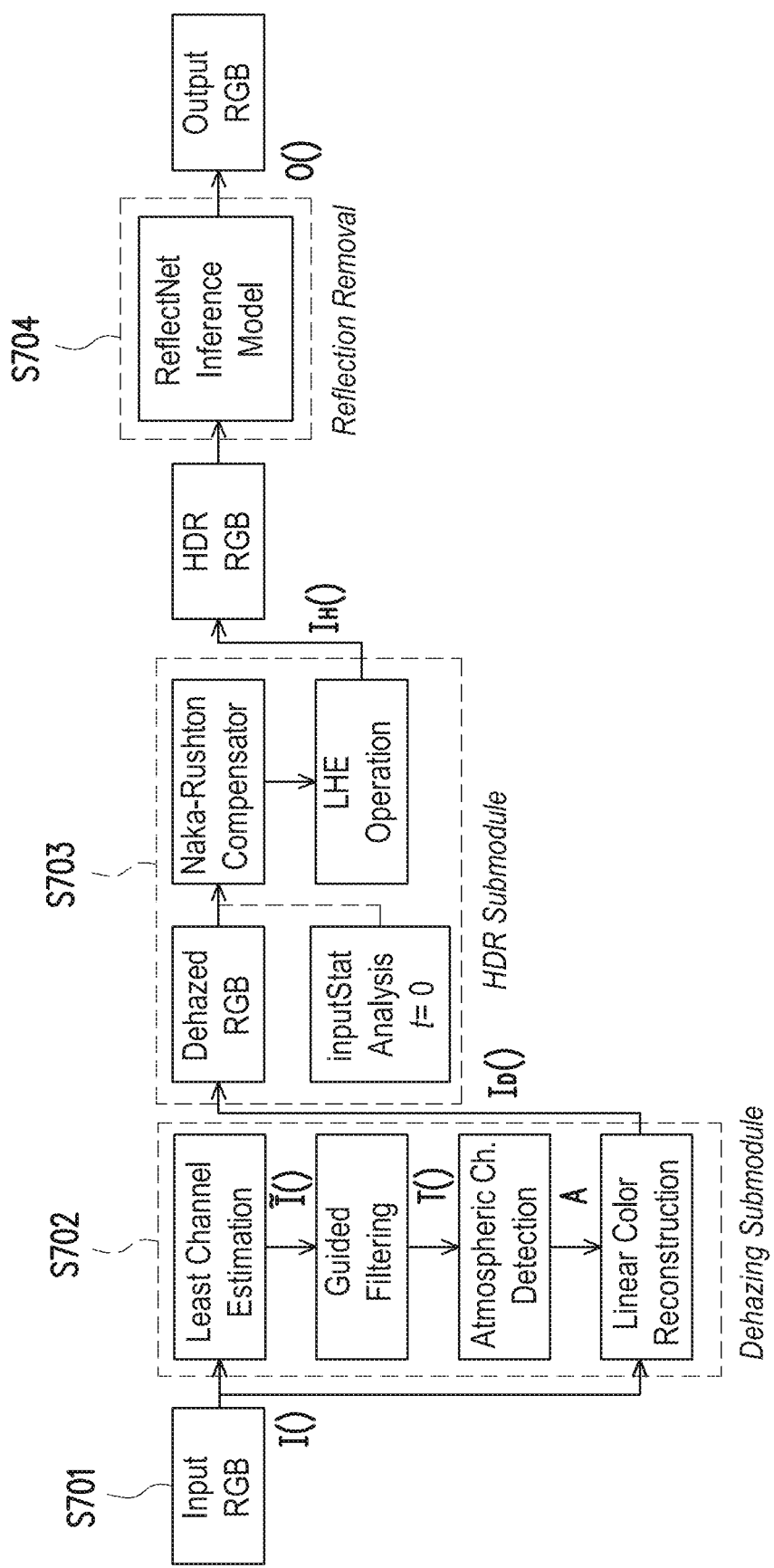
FIG. 7 is a detailed flow diagram which illustrates steps of an image dehazing method in accordance with one of the exemplary embodiments of the disclosure.

FIG. 7 is a detailed flow diagram which illustrates steps of an image dehazing method in accordance with one of the exemplary embodiments of the disclosure. In step S701, the image dehazing apparatus would receive an input RGB image through the sensor. The input RGB image could be denoted as I( ) In one of exemplary embodiments, in step S702, the input RGB image I( ) is firstly processed by image dehazing module to remove adverse effects from haze, rain or any other intermediary medium that shall attenuate the amount of light received by the camera sensor. Concretely, in one embodiment, the image dehazing module in step S702 could be implemented by four submodules: (a) Least Channel Estimation (b) Guided Filtering (c) Atmospheric channel Detection (d) Linear Color Reconstruction. After the input RGB image I( ) is processed by the image dehazing module, an output dehazed image denoted as $I_D$( ) could be generated.

In step S703, in one of the exemplary embodiments, the HDR module could recover the decimation of image brightness that might be contributed from either image dehazing module that darkens the image and/or exposures from light or low light environment. More specifically, the HDR module includes two submodules: Naka-Rushton compensator and Local Histogram Equalization (LHE) operation. Naka-Rushton compensator is a compensating formula to recover image brightness from any under- or over-exposures. This compensation could take statistical information from the dehazed image $I_D$( ) which was computed during initialization. LHE operation is a local histogram equalization technique that could enhance image contrast for each color channel (r, g, b) for any loss of contrast that might be induced from Naka-Rushton compensator. After the dehazed image $I_D$( ) is processed by the HDR module, an HDR image denoted as $I_H$( ) could be generated.

In step S704, in one of the exemplary embodiments, the reflection removal module could use a machine learning approach, namely, a ReflectNet Inference Model that could be based on a deep learning architecture. In one embodiment, the ReflectNet Inference Model could be implemented by an encoder-decoder network with pretrained model from a segmentation architecture. The encoder side and pretrained model (from segmentation architecture) would create hypercolumn features that would be decoded by the decoder side for separation of a reflection map against the output RGB image denoted as O( ).

Figure 8:
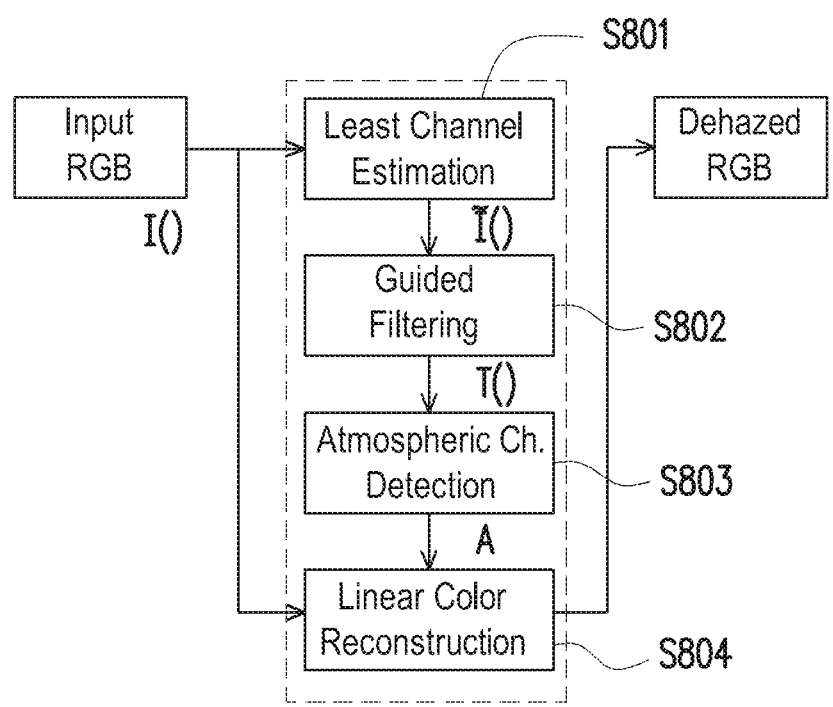
FIG. 8 is a detailed flow diagram which illustrates algorithms of a dehazing module in accordance with one of the exemplary embodiments of the disclosure.

FIG. 8 is a detailed flow diagram which illustrates algorithms of a dehazing module in accordance with one of the exemplary embodiments of the disclosure. The dehazing module could be mathematically formulated as follows:

$$I(x)=I_D(x)T(x)+A(1-T(x)), \quad (1)$$

where I( ) is the input RGB image, $I_D$( ) is the output dehazed image, T( ) is a haze transmission map, A is an Atmospheric coefficient, and x is a pixel location.

At step S801, in one of the exemplary embodiments, the least channel estimation in atmospheric detection was designed based on the nature of haze/rain or any intermediary medium expressed in equation (1). With the absence of haze or haze-free image, the color saturation of most pixels would reflect the actual color of the objects, whereas the presence of haze would introduce attenuation effect that increases the image brightness and reduces the color saturation. In the event of haze-free images, at least a color channel of the input RGB image I( ) would fall in the low-end spectrum of intensity. In other words, by observing the color channel with the least pixel value would reflect to the presence of haze medium as shown in equation (1).

Concretely, in one embodiment, the least channel estimation implements a block-wise operation that segments the input RGB image I( ) into n(Ω) number of block segments, where Ω(x) is the block segment with center coordinate at x, to estimate the least channel pixel values of the corresponding Ω(x) as formulated in the following expression:

$$\tilde{I}(x) = \min_{c\in\{r,g,b\}}\left(\min_{y\in\Omega(x)}(I_c(y))\right), \quad (2)$$

where r, g, b are the color channel in the input RGB image I( ) The dimension of Ω(x) is a user-constraint that could be fine-tuned to achieve desired dehazing performance. Higher dimension of Ω(x) would constitute lower resolution of least channel map $\tilde{I}$( ); whereas lower dimension of Ω(x) may create over estimation of the least channels.

At step S802, in one of the exemplary embodiments, guided filtering is implemented as taught by A. Levin, D. Lischinski, and Y Weiss. *A Closed Form Solution to Natural Image Matting. Computer Vision and Pattern Recognition*, vol. 1, pp. 61-68, 2006., that is, by refining the shape of the inverted least channel map $\tilde{I}$( ) into a haze transmission map T( ) based on color and shape information in the input RGB image I( ) Concretely, in one embodiment, the guided filtering can be formulated as follows:

$$(L+\lambda E)T(x)=\lambda(1-\tilde{I}(x)), \quad (3)$$

where E is identity matrix with size of I( ) and λ is parameter for soft constraint. The value of A would determine how much influence does I( ) to control the shape refinement in $\tilde{I}$( ). Notice that in (3), the least channel map $\tilde{I}$( ) was inverted since T( ) would have to reflect the transmission of haze. It means that low values in T( ) represent near objects or low haze-induced effects, while low values in $\tilde{I}$( ) correspond to the contrary of T( ).

More specifically, in one embodiment, the L in (3) is a Laplacian matrix formulated as follows:

$$L = \sum_{k|(i,j)\in\omega_k} \left(\rho_{ij} - \frac{1}{n(\omega_k)}\left(1 + (I_i - \mu_k)^T\left(\sigma_k + \frac{\varepsilon}{n(\omega_k)}E_3\right)^{-1}(I_j - \mu_k)\right)\right), \quad (4)$$

where $I_i, I_j$ are colors of I( ) at i,j pixels, $\rho_{ij}$ is the Kronecker delta, $\omega_k$ is window kernel with size of n( ), $\mu_k, \sigma_k$ are mean and covariance in $\omega_k$, $\varepsilon$ is the regularizing parameter and $E_3$ is identity matrix (analogous to E in equation (3)) with 3×3 dimension.

At step S803, in one of the exemplary embodiments, the atmospheric coefficient could be estimated using the atmospheric channel detection. Said submodule finds the intensity value of I( ) from the lowest pixels in T( ) as mathematically expressed as follows:

$$A = \min_x T(x), \quad (5)$$

Note that this submodule does not estimate the Atmospheric coefficient based on the brightest pixel in the image as it may not be the correct representation of the airlight intensity. The utilization of T ensures the location of pixel that reflect the airlight intensity by assuming large transmission value to be the farthest object/environment; in other words, the airlight intensity.

At step S804, in one of the exemplary embodiments, after the haze transmission map T( ) and the Atmospheric coefficient A could be determined, the linear color reconstruction could recover the color channels in I( ) against any haze effect using the haze transmission map T( ) and Atmospheric coefficient A. The operation is a pixel-wise calculation over each color channel as formulated in the following:

$$I_D() = \frac{I(x) - A}{T(x)} + A \quad (6)$$

Figure 9:
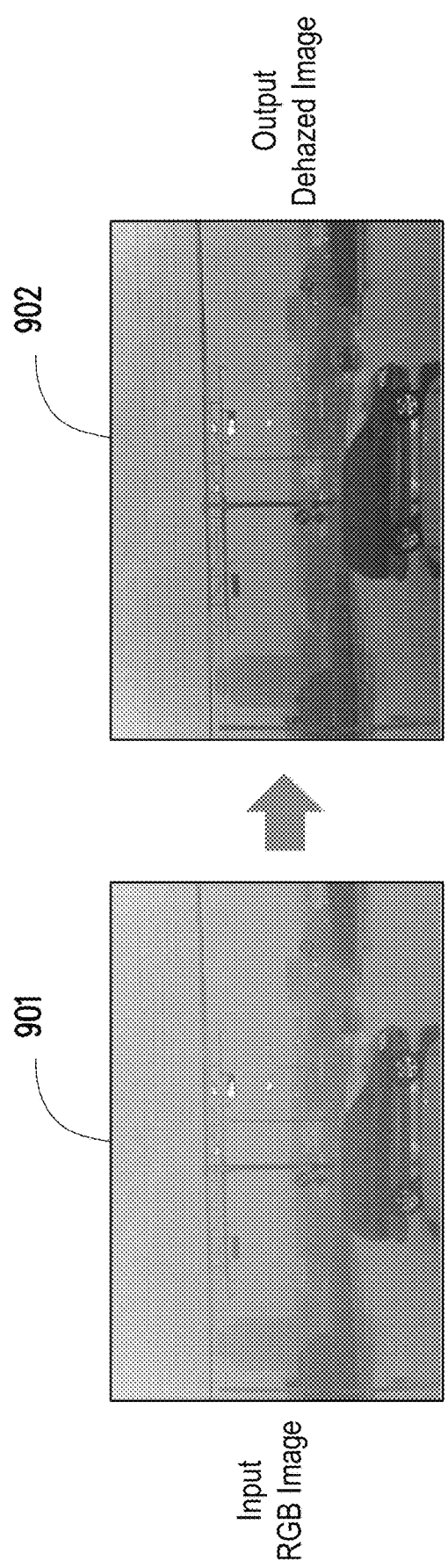
FIG. 9 illustrates an implementation example of an input RGB image and an output dehazed image processed by algorithms of a dehazing module.

FIG. 9 illustrates an implementation example of an input RGB image and an output dehazed image processed by algorithms of a dehazing module. Referring to FIG. 9, the linear color reconstruction is able to remove/suppress the haze-induced image 901 into a haze-free image 902. Although the haze-free image 902 introduces better visibility; the overall image brightness was reduced since the nature of image dehazing is to reduce brightness from haze-induced images.

Figure 10:
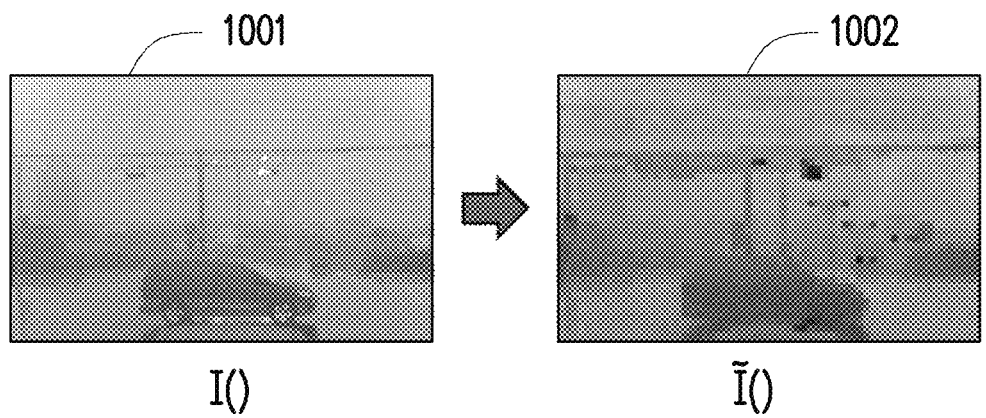
FIG. 10 illustrates an implementation example of an input RGB image and a least channel map processed by a Least Channel Estimation algorithm in a dehazing module in accordance with one of the exemplary embodiments of the disclosure.

FIG. 10 illustrates an implementation example of an input RGB image 1001 and a least channel map 1002 processed by a Least Channel Estimation algorithm in a dehazing module. The Least Channel Estimation algorithm calculates the least channel map 1002 of the input RGB image 1001 based on a block operation. At the presence of haze, the pixel value of an object would be influenced accordingly with its relative position to the camera. In FIG. 10, the least channel map 1002 constitutes a depth-like map, which is perceived indirectly as haze medium creates a sense of depth perception. Since least channel estimation uses channel with least pixel value; the presence of bright or highly saturated object(s) would influence the depth-like effect in the least channel map 1002 as like the traffic light shown in FIG. 10.

Figure 11:
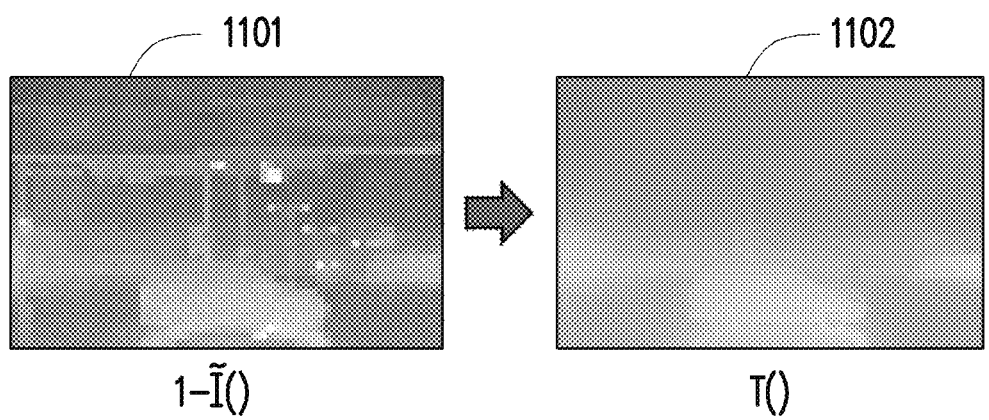
FIG. 11 illustrates an implementation example of an inverted least channel map and a haze transmission map processed by a Guided Filtering algorithm in a dehazing module in accordance with one of the exemplary embodiments of the disclosure.

FIG. 11 illustrates an implementation example of an inverted least channel map 1101 and a haze transmission map 1102 processed by a Guided Filtering algorithm in a dehazing module. As shown in FIG. 11, the Guided Filtering algorithm smoothens the coarse shape of the inverted least channel map 1101 as well as rectifying false estimation of least channel based on the color and shape information provided in I using Laplacian transformation. The profile of the objects could be perceived with higher resolution in the haze transmission map 1102.

Figure 12:
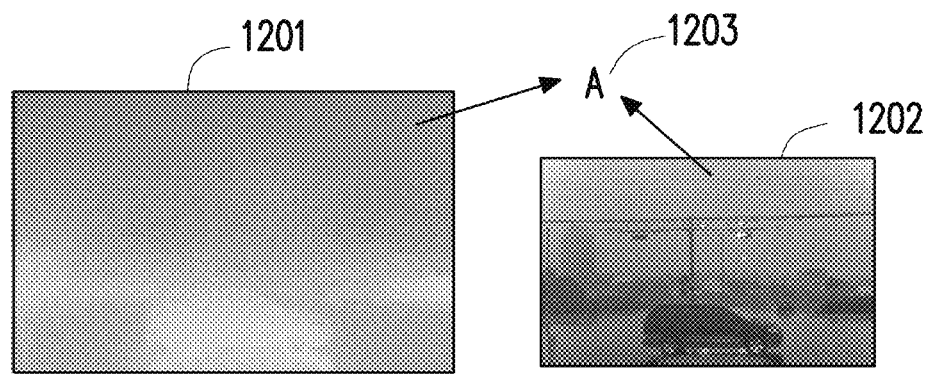
FIG. 12 illustrates an implementation example of an Atmospheric Detection algorithm in a dehazing module finding an intensity value from a haze transmission map in accordance with one of the exemplary embodiments of the disclosure.

FIG. 12 illustrates an implementation example of an Atmospheric Detection algorithm in a dehazing module finding an intensity value 1203 from a haze transmission map 1201 of a dehazed image 1202. As shown in FIG. 12, the Atmospheric Detection algorithm could estimate the intensity value 1203 representing the atmospheric coefficient A. The intensity value 1203 is found from the lowest pixels in the haze transmission map 1201. The utilization of the haze transmission map 1201 ensures the location of pixel that reflect the airlight intensity by assuming large transmission value to be the farthest object/environment; in other words the airlight intensity.

Figure 13:
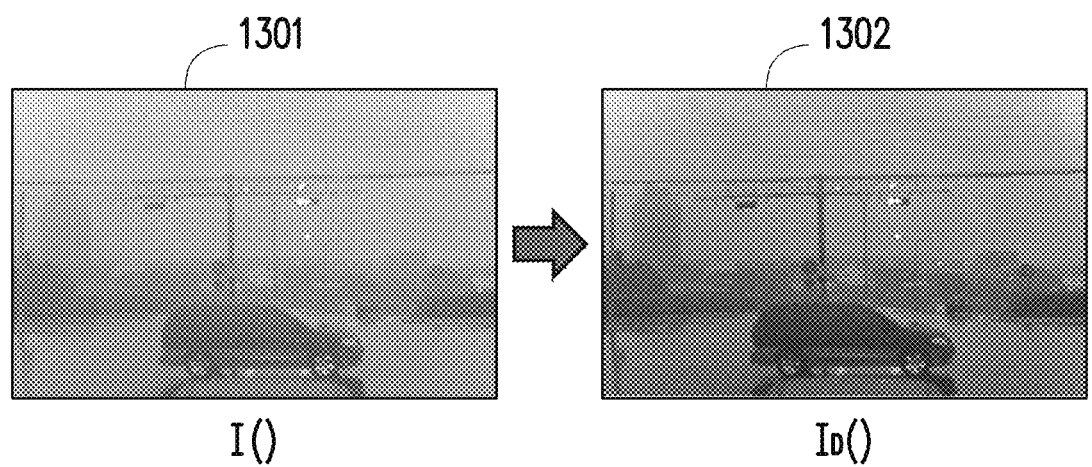
FIG. 13 illustrates an implementation example of a Linear Color Reconstruction algorithm in a dehazing module recovering a dehazed RGB image in accordance with one of the exemplary embodiments of the disclosure.

FIG. 13 illustrates an implementation example of a Linear Color Reconstruction algorithm in a dehazing module recovering a dehazed RGB image 1302 from an input image 1301. As shown in FIG. 13, the Linear Color Reconstruction algorithm could remove or suppress the haze-induced image in the input image 1301 and recover a haze-free image version in the dehazed RGB image 1302. Although the haze-free image 1302 introduces better visibility; the overall image brightness was reduced since the nature of image dehazing is to reduce brightness from the input image 1301.

Figure 14:
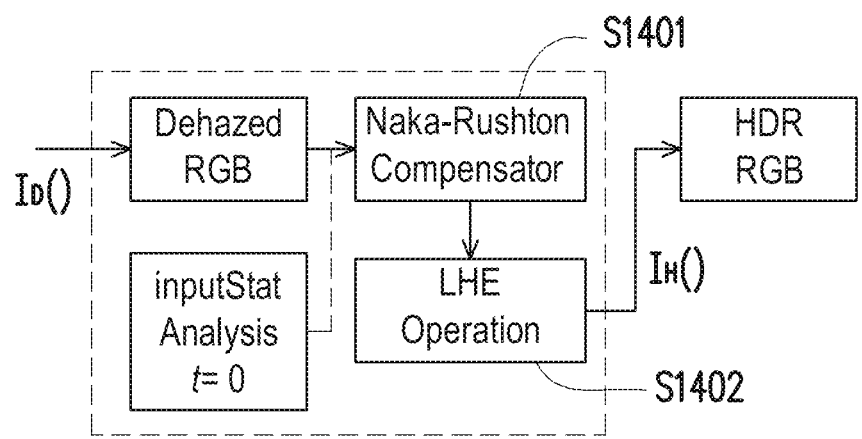
FIG. 14 is a detailed flow diagram which illustrates algorithms of an HDR module in accordance with one of the exemplary embodiments of the disclosure.

FIG. 14 is a detailed flow diagram which illustrates algorithms of an HDR module in accordance with one of the exemplary embodiments of the disclosure. At step S1401, in one of the exemplary embodiments, the Naka-Rushton compensator was designed with a pixel-wise segmentation and a pixel transformation.

Figure 15:
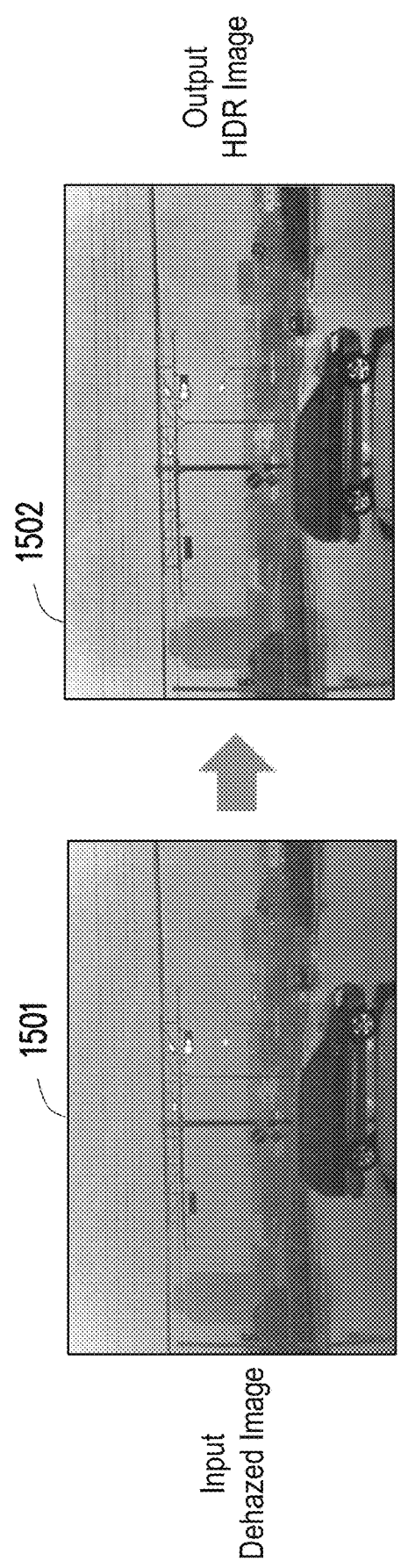
FIG. 15 illustrates an implementation example of an input dehazed image to an HDR module and an output HDR image processed by an HDR module in accordance with one of the exemplary embodiments of the disclosure.

FIG. 15 illustrates an implementation example of an input dehazed image 1501 to an HDR module and an output HDR image 1502 processed by an HDR module. As shown in FIG. 15, the HDR module recovers image brightness in the output HDR image 1502 that might be in the input dehazed image 1501 due to a dehazing module which darkens image or exposures from light or low light environment.

Figure 16:
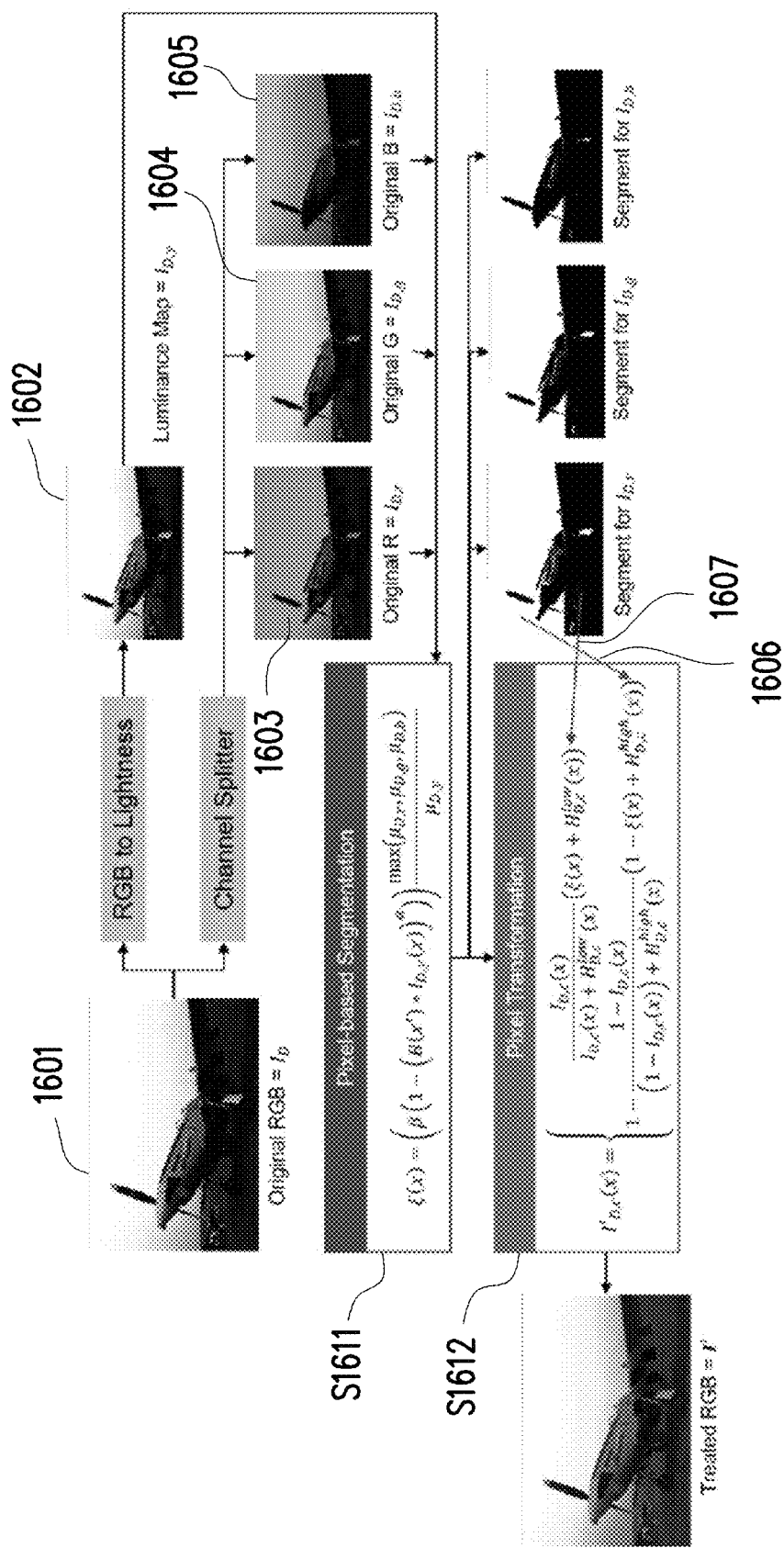
FIG. 16 is a flow diagram which illustrates enhancing image brightness of a dehazed RGB image by a Naka-Rushton Compensator in accordance with one of the exemplary embodiments of the disclosure.

FIG. 16 is a flow diagram which illustrates enhancing image brightness of a dehazed RGB image by a Naka-Rushton Compensator in accordance with one of the exemplary embodiments of the disclosure. Concretely, FIG. 16 illustrates details of Naka-Rushton compensator. This submodule starts with a color rectification that converts color channels of an original RGB image 1601 into luminance map 1602, denoted as $I_{D,y}$. The original RGB image 1601 $I_D$ are decomposed into r, g, b channels 1603~1605, namely, $I_{D,r}, I_{D,b}, I_{D,g}$, respectively.

At step S1611, these maps 1603~1605 are used to compute a threshold value of pixel clustering to segment the bright pixels 1606 against dark pixels 1607 of $I_D$ as:

$$\xi(x) = (\beta(1 - (B(x') * I_{D,y}(x))^\alpha))\frac{\max(\mu_{D,r}, \mu_{D,g}, \mu_{D,b})}{\mu_{D,y}}, \quad (7)$$

where $\mu_{D,c}$ represents the mean image pixel of $I_D$ at $c^{th}$ channel. There are two coefficients in (7) that non-linearly and linearly scale the luminance in $I_{D,y}$, namely $\alpha$ and $\beta$. A bilinear filter kernel called B is employed to smooth out noises from $I_{D,y}$.

At step 1612, from the pixel-based segmentation, the threshold value $\xi$ could be used to segment the original RGB image 1601 $I_D$ into different color channels 1603~1605. $I_{D,C}$ are segmented based on ξ and pixels are transformed with the following mathematical expression:

$$I'_{D,c}(x) = \begin{cases} \dfrac{I_{D,c}(x)}{I_{D,c}(x) + H_{D,c}^{low}(x)}(\xi(x) + H_{D,c}^{low}(x)), \\ 1 - \dfrac{1 - I_{D,c}(x)}{(1 - I_{D,c}(x)) + H_{D,c}^{high}(x)}(1 - \xi(x) + H_{D,c}^{high}(x)), \end{cases} \quad (8)$$

where $H_{D,c}^{low}$ and $H_{D,c}^{high}$ are the compensation coefficients that are computed as follows:

$$H_{D,c}^{low}(x) = \frac{1}{n(c)} \sum_c^{n(c)} 1 - \left( (I_{D,c}(x) + ((I_{D,y}(x) + 0.3)\mu_{D,c})) \frac{I_{D,y}(x)\mu_{D,c}}{I_{D,c}(x)\mu_{D,y}} \right), \quad (9)$$

and $$H_{D,c}^{high}(x) = \frac{1}{n(c)} \sum_c^{n(c)} (1 - \mu_{D,c}) \frac{I_{D,c}(x)\mu_{D,y}}{I_{D,y}(x)\mu_{D,c}} I_{D,c}(x). \quad (10)$$

Referring to FIG. 14, at step S1402, in one embodiment, LHE operation is a local histogram equalization technique that enhances image contrast for each color channel (r, g, b) for any loss of contrast that might be induced from Naka-Rushton compensator.

Figure 17:
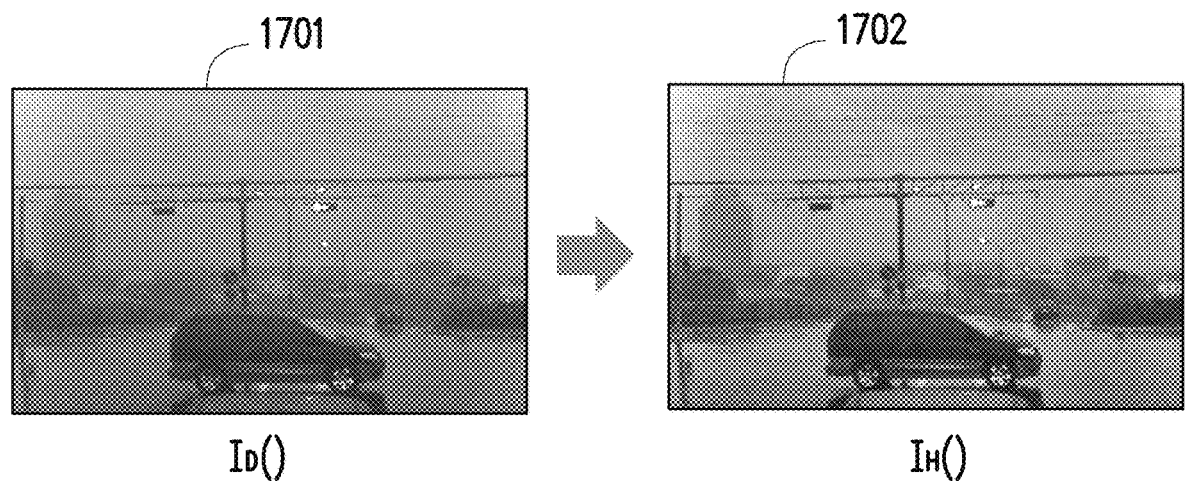
FIG. 17 illustrates an implementation example of enhancing image contrast of a dehazed RGB image by a Local Histogram Operation in accordance with one of the exemplary embodiments of the disclosure.

FIG. 17 illustrates an implementation example of enhancing image contrast of a dehazed RGB image $I_D(\ )$ 1701 and output an HDR image $I_H(\ )$ 1702 by a Local Histogram Operation. As shown in FIG. 17, the contrast in the HDR image $I_H(\ )$ 1702 could be enhanced by the Local Histogram Operation. The contrast may be reduced because of Naka-Rushton compensator that equalizes brightness but may lose contrast ratio in the dehazed RGB image $I_D(\ )$ 1701.

Figure 18:
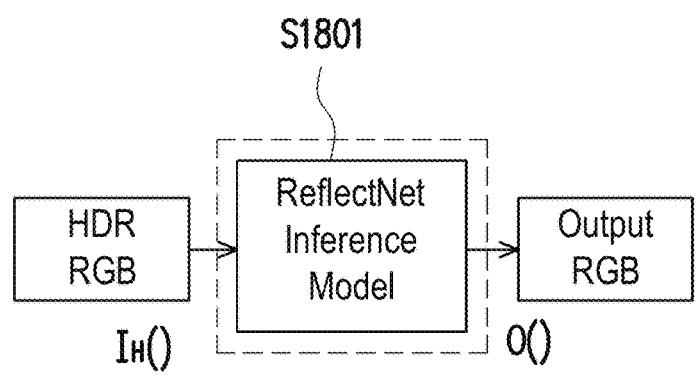
FIG. 18 is a flow diagram which illustrates removing reflection of an HDR image by a ReflectNet inference model in accordance with one of the exemplary embodiments of the disclosure.

FIG. 18 is a flow diagram which illustrates removing reflection of an HDR image by a ReflectNet inference model in accordance with one of the exemplary embodiments of the disclosure. At step S1801, in one embodiment, the ReflectNet inference model could be designed with a combination of normal and dilated convolutions, which are commonly utilized for segmentation network.

Figure 19:
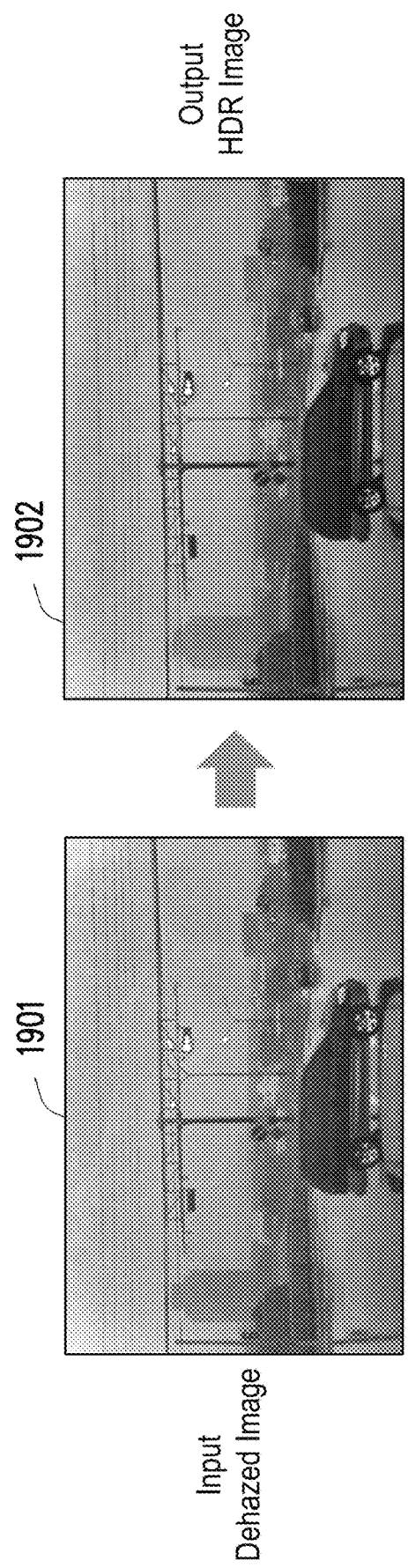
FIG. 19 illustrates an implementation example of an input dehazed image and an output HDR image processed by a ReflectNet inference model in accordance with one of the exemplary embodiments of the disclosure.

FIG. 19 illustrates an implementation example of an input dehazed image 1901 and an output HDR image 1902 processed by a ReflectNet inference model. As shown in FIG. 19, the ReflectNet inference model suppress any reflection-induced artefacts in the output HDR image 1902 from the input dehazed image 1901 that might have been contributed from the enhancement of minor reflections by HDR enhancement or natively from the reflection condition.

Figure 20:
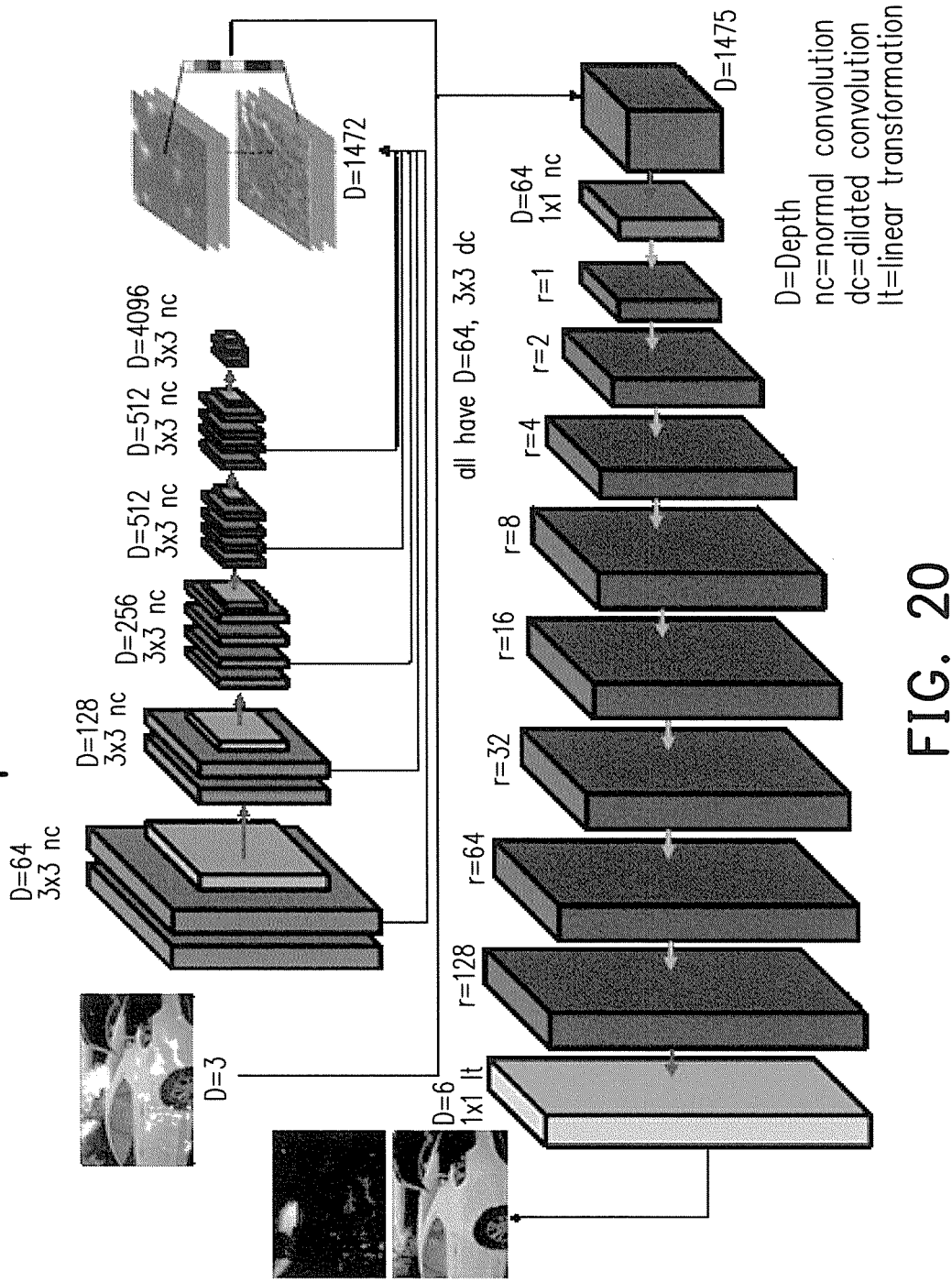
FIG. 20 illustrates an implementation example of an encoder-decoder architecture of a ReflectNet inference model in accordance with one of the exemplary embodiments of the disclosure.

FIG. 20 illustrates the architecture of the ReflectNet inference model in one exemplary embodiment. The ReflectNet inference model may use an encoder-decoder network with pretrained model from a segmentation architecture. The encoder side and pretrained model (from segmentation architecture) would create a hypercolumn features that would be decoded by the decoder side for separation of reflection map against the output RGB image. The encoder-decoder architecture is trained for learning features related to reflection removal; while the pretrained model provide learned features to perform spatial segmentation.

Figure 21:
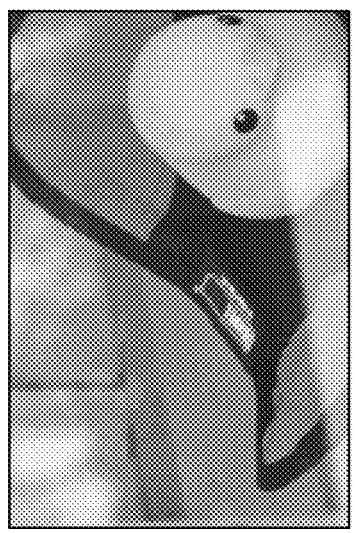
FIG. 21 illustrates an implementation example of an original RGB image and a reflection version of the RGB image in a dataset used to train a ReflectNet inference model in accordance with one of the exemplary embodiments of the disclosure.
Figure 21:
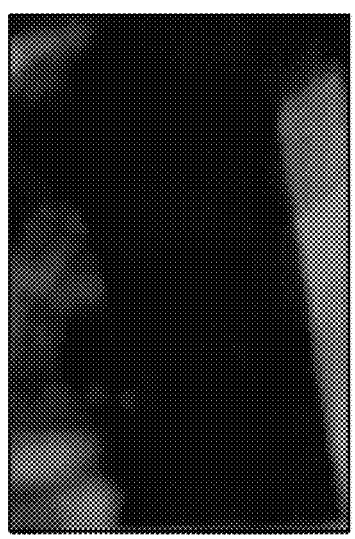
Figure 21:
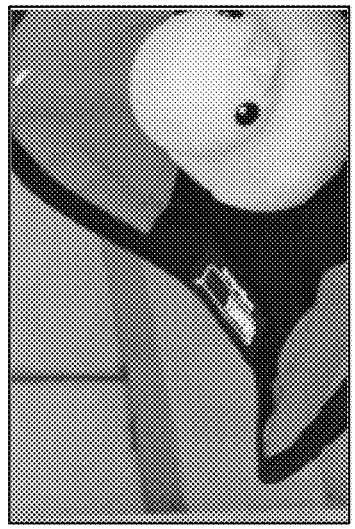

Referring to FIG. 21, in one embodiment, the ReflectNet inference model could be trained using a pair of original RGB image and its reflection image. In this embodiment, the dataset is generated using ImageMix function that blends two images into a blended image. The original RGB image would be used as ground truth, while the blended image as input.

In one of the exemplary embodiments, $GT_R$ denotes the original RGB image, and $I(\ )$ denotes the blended image or any reflection-induced RGB image; $O(\ )$ and $O_R(\ )$ are output reflection-removed RGB image and estimated reflection map, respectively. Loss function is calculated as:

$$L(\theta) = w_1 L_f(\theta) + w_2 L_a(\theta) + w_3 L_g(\theta), \quad (11)$$

where w are weights to equalize losses and θ is network weights. There are three loss functions in (11) that includes feature loss, adversarial loss and gradient loss. Feature loss is computed as follows:

$$L_f(\theta) = \sum_{(I,O)\in\delta} \sum_l \|\phi_l(GT_R) - \phi_l(O(I,\theta))\|_1. \quad (12)$$

This loss compares selected features at l layer difference when model running ground truth $GT_R$ against the result from input RGB image $I(\ )$ Adversarial loss measures the negative logarithmic probability of $O(\ )$ to have natural ground truth as follows:

$$L_a(\theta) = \sum_{I\in\delta} -\log D(I, O(I,\theta)). \quad (13)$$

Finally, the gradient loss measures the contrast comparison between ground truth and resultant image, which is formulated as follows:

$$L_g(\theta) = \sum_{I\in\delta}\sum_{n=1}^{N} \left\| \tanh\left(\nabla O \sqrt{\frac{\|\nabla O_R\|_F}{\|\nabla O\|_F}}\right) \odot \tanh\left(\nabla O_R \sqrt{\frac{\|\nabla O\|_F}{\|\nabla O_R\|_F}}\right) \right\|_F. \quad (14)$$

The hyperbolic tangent in this loss function is used to minimize edge discrepancy between $O(\ )$ and $O_R(\ )$ that edges in $I(\ )$ should either from $O(\ )$ or $O_R(\ )$, not both.

FIG. 22 is a table which compares an implementation example of an image dehazing method with a benchmark method in related art. Referring to FIG. 22, the performance evaluation consists of two methods: (a) proposed method and (b) benchmark method. Both methods are image pre-processing algorithms with similar framework. Based on the flow diagram in FIG. 5, the proposed method includes: image dehazing, HDR enhancement and reflection removal. To ensure evaluation fairness, the benchmark method is made to conform with the generalized framework with each function are constructed from the prior state of the arts. For instance, image dehazing is represented with color attenuation as taught by D. Ngo et al, "*Improved Color Attenuation Prior for Single-Image Haze Removal,*" *Applied Science*, [*Online*], September 2019.; HDR enhancement is represented with histogram equalization as taught by *OpenCV*, "*Histogram Equalization,*" *Open Source Computer Vision*, [*Online*], July 2020.; reflection removal is represented with CEILNet as taught by Q. Fan et al, "*A Generic Architecture for Single Image Reflection Removal and Image Smooth-*

*ing,"* ICCV, 2017. Both proposed and benchmark methods are implemented with identical hardware and software as shown in FIG. 22.

FIG. 23 is a table which compares performance evaluations of an implementation example of an image dehazing method with a benchmark method in related art. In one of the exemplary embodiments, various metrics including Entropy-based Measurement Enhancement (EME) 2301, Contrast Improvement Index (CII) 2302, Intensity Measure (IM) 2303 could be implemented to perform quantitative assessment of the perceptual quality between the benchmark method in related art and the proposed image dehazing method.

Entropy-based Measurement Enhancement (EME) 2301 is a metric to find the improvement index of output compared to input based on entropy measure. Larger score of EME represents higher index of entropy information. The maximum value of EME 2301 is ∞. In one embodiment, EME 2301 is calculated as:

$$EME = \frac{\Sigma_{p=1}^{N_p} \frac{1}{N_b} \times \Sigma_{b=1}^{N_b} 20 \ln \frac{\max_{p \leq b < (p+N_b)} O_y(b)}{\min_{p \leq b < (p+N_b)} O_y(b)}}{\Sigma_{p=1}^{N_p} \frac{1}{N_b} \times \Sigma_{b=1}^{N_b} 20 \ln \frac{\max_{p \leq b < (p+N_b)} I_y(b)}{\min_{p \leq b < (p+N_b)} I_y(b)}}. \quad (15)$$

where $N_p$ is total pixel in the compared image, $N_b$ is the dimension of block size and $I_y$ also $O_y$ are reference and input images.

Contrast Improvement Index (CII) 2302 is a metric to find the improvement index of output compared to input based on contrast measure. Larger score of CII 2302 represents higher index of contrast improvement. The maximum value of CII 2302 is ∞. In one embodiment, CII 2302 is formulated as follows:

$$CII = \frac{\sum_{p=1}^{N_p} \frac{\max_{p \leq b < (p+N_b)} O_y(b) - \min_{p \leq b < (p+N_b)} O_y(b)}{\max_{p \leq b < (p+N_b)} O_y(b) + \min_{p \leq b < (p+N_b)} O_y(b)}}{\sum_{p=1}^{N_p} \frac{\max_{p \leq b < (p+N_b)} I(b) - \min_{p \leq b < (p+N_b)} I_y(b)}{\max_{p \leq b < (p+N_b)} I_y(b) + \min_{p \leq b < (p+N_b)} I_y(b)}}, \quad (16)$$

where $N_p$ is total pixel in the compared image, $N_b$ is the dimension of block size and $I_y$ also $O_y$ are reference and input images.

Intensity Measure (IM) 2303 is a metric to find the ratio of brightness perseverance based on the original image. Larger score of IM 2303 represents better perseverance of image brightness. The maximum value of IM 2303 is 1. In one embodiment, IM 2303 is defined as:

$$IM = \frac{\Sigma_{N_p} O_y}{\Sigma_{N_p} I_y} \quad (17)$$

where $N_p$ is total pixel in the compared image, and $I_y$ also $O_y$ are reference and input images.

In one embodiment, the evaluation was performed on all three stages based on the generalized framework, sequentially. According to evaluations in FIG. 23, the proposed method outperformed the benchmark method in all of the metric in all of the stages. This includes image dehazing, HDR submodule and reflection removal functions. Based on the final result scores (see reflection removal results), the proposed method achieved CII=2.695 and EME=2.336 or +39.9% higher and +17.5% higher than the benchmark method. These results suggested that the proposed method could enhance the contrast and entropy information in RGB images.

In one embodiment, in terms of intensity measurement ratio, the proposed method was able to preserve brightness in average of 74.8%; while the benchmark method was able to preserve brightness in average of 55.2%. This result may demonstrate the capability of the proposed method to keep the brightness as the original image would provide; while removing the haze, reflections and contrast ratio. Aside from the perceptual indexes, the proposed and benchmark methods were also assessed in according to the time complexity. FIG. 23 shows the time complexity of the proposed method was lower than the benchmark method in all of the function categories. This demonstrates the efficiency of the proposed method against the related art.

Figure 24:
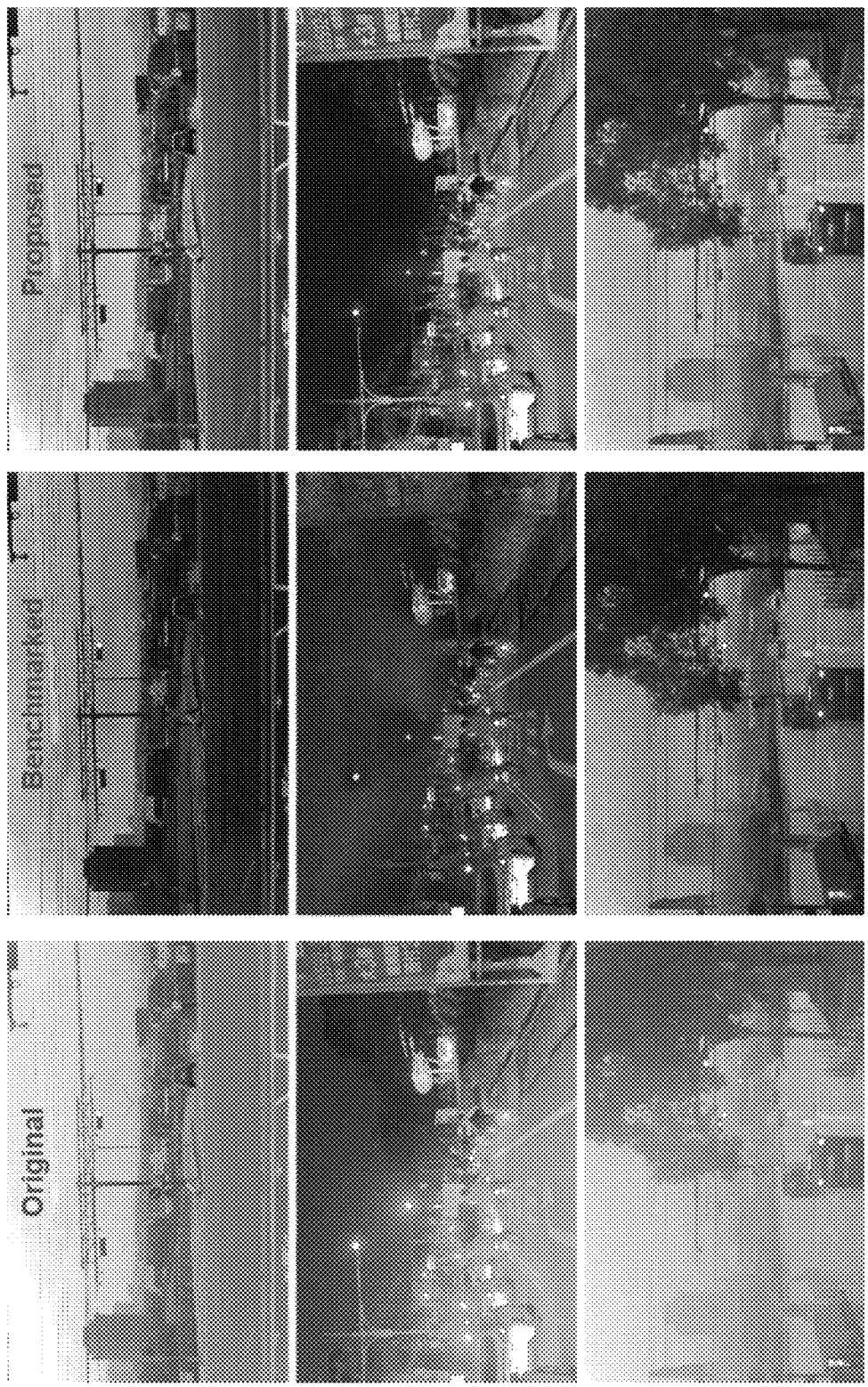
FIG. 24 illustrates examples of input original images and output images processed by an image dehazing method in accordance with one of the exemplary embodiments of the disclosure, in comparison with output images processed by a benchmark method in related art.

FIG. 24 illustrates examples of input original images and output images processed by an image dehazing method in accordance with one of the exemplary embodiments of the disclosure, in comparison with output images processed by a benchmark method in related art. Referring to FIG. 24, qualitatively, the benchmark method was not able to robustly remove the haze effect as it introduces several over-smoothing artefacts as well as over-darkening effect that reduces image visibility. On the other hand, the proposed method was able to remove haze with slight brightness loss and proper color reproduction compared to original RGBs.

FIG. 25 is a table which illustrates performance evaluations of object detection on RGB images processed by an image dehazing method in accordance with one of the exemplary embodiments of the disclosure in comparison with the performance evaluations of object detection on original RGB images and RGB images processed by a benchmark method in related art. The evaluation uses IoU-based calculation to fine the percentage of overlap between the prediction and ground truth as:

$$IoU = \frac{B_D \cap B_R}{B_D + B_R - (B_D \cap B_R)} \quad (18)$$

where $B_D$ and $B_R$ are detection box and ground truth data, respectively.

Referring to FIG. 25, in one embodiment, using the IoU information, true positive (TP), false positive (FP) and false negative (FN) are measured to obtain accuracy (ACC) 2501 and false positive rate (FPR) 2502 that are formulated as follows:

$$ACC = \frac{TP}{TP+FP+FN} \text{ and } FPR = \frac{FP}{TP+FP} \quad (19)$$

Figure 26:
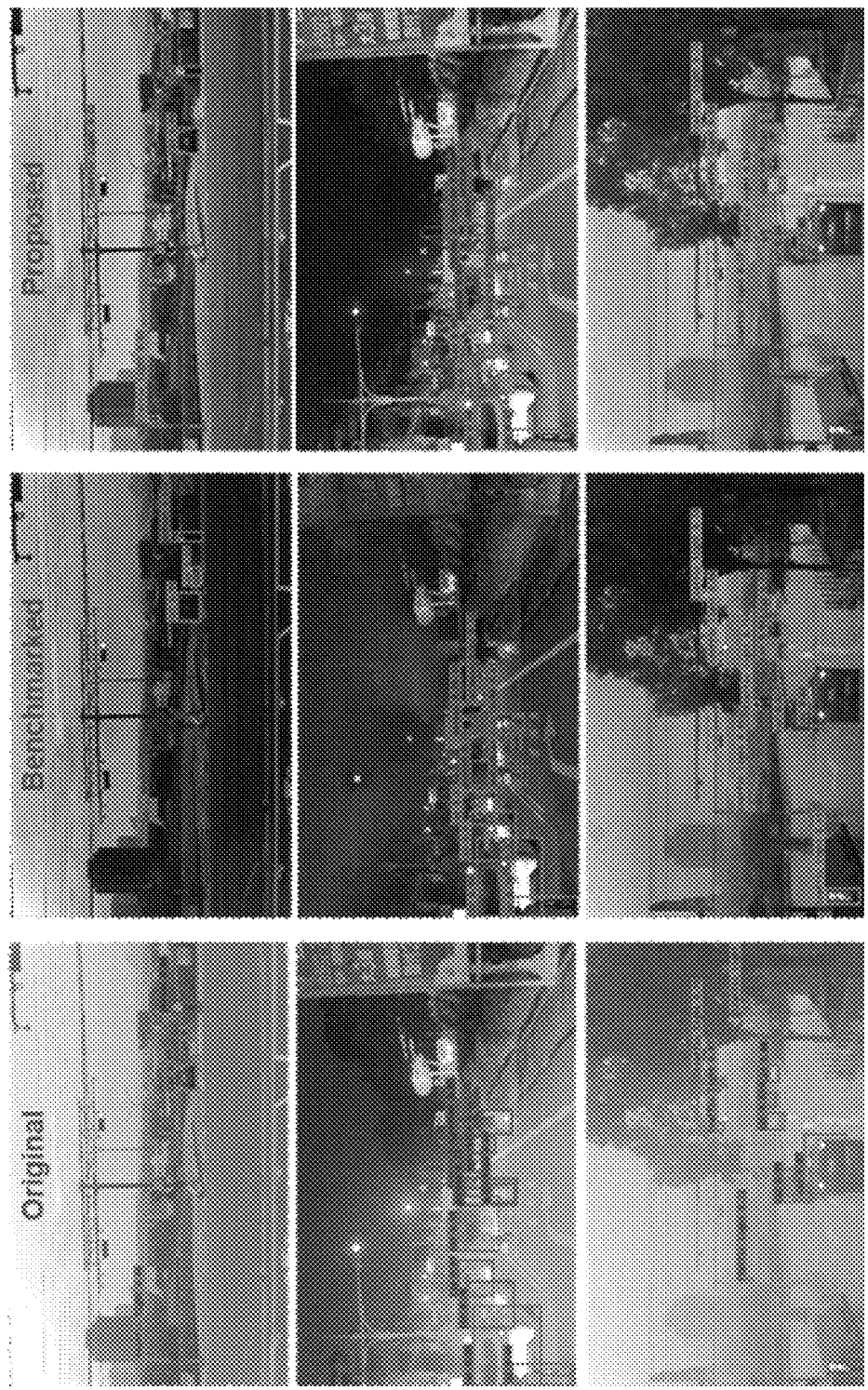
FIG. 26 illustrates implementation examples of an object detection algorithm on original images, images processed by benchmark method in related art, and images processed by an image dehazing method in accordance with one of the exemplary embodiments of the disclosure.

In one embodiment, according to experiments in FIG. 25, the resultant images from the proposed method achieved better accuracy and false positive rates. The proposed method was able to enhance accuracy by 8.2% and reduce false positive rates by 10.9%, whereas the benchmark method increased accuracy by 1.9% and increased false positive rates by 4.2%. This phenomenon shows that the benchmark method may have over-enhanced its image to a point that created undesired artefacts for YOLOv3 to infer as objects. The visualization of object detection results are shown in FIG. 26.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image dehazing method comprising:
receiving an image;
dehazing the image by a dehazing module to output a dehazed RGB image;
recovering image brightness of the dehazed RGB image by an HDR module to output an HDR image; and
removing reflection of the HDR image by a ReflectNet inference model, wherein the ReflectNet inference model uses a deep learning architecture,
wherein the step of dehazing the image by a dehazing module to output a dehazed RGB image further comprising:
estimating an inverted least channel map by a Least Channel Estimation algorithm;
refining the inverted least channel map into a haze transmission map by a Guided Filtering algorithm;
finding an intensity value of the haze transmission map by an Atmospheric Detection algorithm; and
recovering a dehazed RGB image by a Linear Color Reconstruction algorithm.

2. The method of claim 1, wherein the step of estimating an inverted least channel map by a Least Channel Estimation algorithm further comprising:
segmenting the image into a plurality of block segments, wherein each of the block segment comprising a center pixel; and
finding a pixel with the lowest intensity value of a block segment for all color channels.

3. The method of claim 1, wherein the step of refining the inverted least channel map into a haze transmission map by a Guided Filtering algorithm further comprising:
smoothening the inverted least channel map using a soft constraint parameter to control shape refinement; and
rectifying the inverted least channel map using a Laplacian matrix.

4. The method of claim 1, wherein the step of finding an intensity value of the haze transmission map by an Atmospheric Detection algorithm further comprising:
finding a pixel that has the lowest intensity value in the haze transmission map.

5. The method of claim 1, wherein the step of recovering a dehazed RGB image by a Linear Color Reconstruction algorithm further comprising:
performing a pixel-wise operation to calculate an intensity value of the dehazed RGB image using the haze transmission map and an Atmospheric coefficient, wherein the Atmospheric coefficient is found by the Atmospheric Detection algorithm.

6. The method of claim 1, wherein the step of recovering image brightness of the dehazed RGB image by an HDR module to output an HDR image further comprising:
enhancing image brightness of the dehazed RGB image by a Naka-Rushton Compensator; and
enhancing image contrast of the dehazed RGB image by a Local Histogram Operation.

7. The method of claim 6, wherein the step of enhancing image brightness of the dehazed RGB image by a Naka-Rushton Compensator further comprising:
performing a color rectification that converts a color channel of the dehazed RGB image into a luminance map;
computing a threshold value for segmenting bright and dark pixels in the dehazed RGB image using the luminance map; and
transforming a pixel of the dehazed RGB image using compensation coefficients computed from the luminance map.

8. The method of claim 6, wherein the step of enhancing image contrast of the dehazed RGB image by a Local Histogram Operation further comprising:
performing histogram equalization of intensity for the dehazed RGB image.

9. The method of claim 1, wherein the ReflectNet inference model further comprising an encoder-decoder network with features of a pretrained image segmentation model to separate a reflection map from the image.

10. The method of claim 1, wherein the step of removing reflection of the HDR image by a ReflectNet inference model, the method further comprising:
encoding features from the HDR image; and
decoding the features to output an RGB image.

11. The method of claim 1, wherein the ReflectNet inference model is trained with a loss function comprising:
a feature loss;
an adversarial loss; and
a gradient loss.

12. An image dehazing apparatus comprising:
a sensor; and
a processor coupled to the sensor and the processor is configured at least for:
receiving an image;
dehazing the image by a dehazing module to output a dehazed RGB image;
recovering image brightness of the dehazed RGB image by an HDR module to output an HDR image; and
removing reflection of the HDR image by a ReflectNet inference model, wherein the ReflectNet inference model uses a deep learning architecture,
wherein the processor is further configured for:
estimating an inverted least channel map by a Least Channel Estimation algorithm;
refining the inverted least channel map into a haze transmission map by a Guided Filtering algorithm;
finding an intensity value of the haze transmission map by an Atmospheric Detection algorithm; and
recovering a dehazed RGB image by a Linear Color Reconstruction algorithm.

13. The apparatus of claim 12, wherein the processor is configured for estimating the inverted least channel map by the Least Channel Estimation algorithm further configured for:
segmenting the image into a plurality of block segments, wherein each of the block segment comprising a center pixel; and
finding a pixel with the lowest intensity value of a block segment for all color channels.

14. The apparatus of claim 12, wherein the processor is configured for refining the inverted least channel map into the haze transmission map by a Guided Filtering algorithm further configured for:

smoothening the inverted least channel map using a soft constraint parameter to control shape refinement; and rectifying the inverted least channel map using a Laplacian matrix.

15. The apparatus of claim 12, wherein the processor is configured for finding the intensity value of the haze transmission map by the Atmospheric Detection algorithm further configured for:

finding a pixel that has the lowest intensity value in the haze transmission map.

16. The apparatus of claim 12, wherein the processor is configured for recovering the dehazed RGB image by the Linear Color Reconstruction algorithm further configured for:

performing a pixel-wise operation to calculate an intensity value of the dehazed RGB image using the haze transmission map and an Atmospheric coefficient, wherein the Atmospheric coefficient is found by the Atmospheric Detection algorithm.

17. The apparatus of claim 12, wherein the processor is configured for recovering image brightness of the dehazed RGB image by an HDR module to output an HDR image further configured for:

enhancing image brightness of the dehazed RGB image by a Naka-Rushton Compensator; and enhancing image contrast of the dehazed RGB image by a Local Histogram Operation.

18. The apparatus of claim 17, wherein the processor is configured for enhancing image brightness of the dehazed RGB image by a Naka-Rushton Compensator further configured for:

performing a color rectification that converts a color channel of the dehazed RGB image into a luminance map;

computing a threshold value for segmenting bright and dark pixels in the dehazed RGB image using the luminance map; and transforming a pixel of the dehazed RGB image using compensation coefficients computed from the luminance map.

19. The apparatus of claim 17, wherein the processor is configured for enhancing image contrast of the dehazed RGB image by a Local Histogram Operation further configured for:

performing histogram equalization of intensity for the dehazed RGB image.

20. The apparatus of claim 12, wherein the ReflectNet inference model further configured for an encoder-decoder network with features of a pretrained image segmentation model to separate a reflection map from the image.

21. The apparatus of claim 12, wherein the processor is configured for removing reflection of the HDR image by a ReflectNet inference model, the processor further configured for:

encoding features from the HDR image; and decoding the features to output an RGB image.

22. The apparatus of claim 12, wherein the ReflectNet inference model is trained with a loss function comprising:

a feature loss;

an adversarial loss; and a gradient loss.

* * * * *